US011690118B2

(12) United States Patent
Damnjanovic et al.

(10) Patent No.: US 11,690,118 B2
(45) Date of Patent: Jun. 27, 2023

(54) MULTICONNECTIVITY FOR JOINT USER EQUIPMENT RELAYING

(71) Applicant: QUALCOMM Incorporated, San Diego, CA (US)

(72) Inventors: Jelena Damnjanovic, Del Mar, CA (US); Junyi Li, Franklin Park, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 156 days.

(21) Appl. No.: 17/238,149

(22) Filed: Apr. 22, 2021

(65) Prior Publication Data

US 2022/0346163 A1 Oct. 27, 2022

(51) Int. Cl.
*H04W 76/15* (2018.01)
*H04W 76/14* (2018.01)
(Continued)

(52) U.S. Cl.
CPC ........ *H04W 76/15* (2018.02); *H04B 7/15507* (2013.01); *H04W 76/14* (2018.02); *H04W 88/04* (2013.01); *H04W 92/18* (2013.01)

(58) Field of Classification Search
CPC ....... H04B 7/15; H04B 7/15507; H04L 69/14; H04W 16/26; H04W 76/14; H04W 76/15;
(Continued)

(56) References Cited

U.S. PATENT DOCUMENTS 7,933,293 B2 * 4/2011 Wentink ............... H04B 7/2126
342/359
9,083,422 B2 * 7/2015 Coon ..................... H04W 76/14
(Continued)

FOREIGN PATENT DOCUMENTS

EP 2156574 B1 * 2/2013 ........... H04B 7/2606
EP 3031287 B1 * 3/2020 ......... E04G 23/0218
WO WO-2021088990 A1 * 5/2021 ........... H04W 76/14

OTHER PUBLICATIONS

International Search Report and Written Opinion—PCT/US2022/071252—ISA/EPO—dated Jul. 8, 2022 (2102855WO).

*Primary Examiner* — Thomas R Cairns
(74) *Attorney, Agent, or Firm* — Holland & Hart LLP/Qualcomm Incorporated

(57) ABSTRACT

Methods, systems, and devices for wireless communications are described. A first user equipment (UE) may communicate with a base station via a first connection and with a second UE via a sidelink connection. The base station may transmit, to the first UE, configuration information including information for one or more relay connections, such as a relay connection between the first UE and the base station via the second UE using the sidelink connection. The first UE may activate (e.g., based on an indication from the base station) the relay connection(s) according to the configuration information. The first UE, the second UE, and the base station may communicate on the relay connection(s) according to the configuration information. In some examples, the base station may transmit, to a UE, configuration information and/or an activation indication for multiple relay connections, where each respective relay connection may be separately configured, activated, or deactivated.

30 Claims, 13 Drawing Sheets

(51) Int. Cl.
    *H04W 88/04*     (2009.01)
    *H04B 7/155*     (2006.01)
    *H04W 92/18*     (2009.01)

(58) Field of Classification Search
    CPC ..... H04W 88/04; H04W 92/04; H04W 92/10; H04W 92/18; Y02D 30/70
    See application file for complete search history.

(56) References Cited

U.S. PATENT DOCUMENTS

| | | | | |
|---|---|---|---|---|
| 9,451,510 | B2 * | 9/2016 | Faerber | H04W 36/0083 |
| 9,699,817 | B2 * | 7/2017 | Ginnela | H04W 8/005 |
| 10,091,684 | B2 * | 10/2018 | Chen | H04W 28/12 |
| 10,122,829 | B2 * | 11/2018 | Saavedra | H04L 12/2863 |
| 10,439,682 | B2 * | 10/2019 | Tseng | H04W 36/0033 |
| 10,694,579 | B2 * | 6/2020 | Tsuda | H04W 68/02 |
| 11,477,796 | B2 * | 10/2022 | Lovlekar | H04W 36/14 |
| 2016/0192439 | A1 * | 6/2016 | Phuyal | H04L 1/08 |
| | | | | 370/315 |
| 2019/0132042 | A1 * | 5/2019 | Tachigi | H04B 7/15507 |
| 2020/0146048 | A1 | 5/2020 | Lee et al. | |
| 2021/0058866 | A1 | 2/2021 | Hosseini et al. | |
| 2021/0144781 | A1 * | 5/2021 | Xu | H04W 8/005 |
| 2021/0298063 | A1 * | 9/2021 | Damnjanovic | H04W 76/14 |
| 2022/0046485 | A1 * | 2/2022 | Hong | H04W 36/00837 |
| 2022/0095243 | A1 * | 3/2022 | He | H04W 52/365 |
| 2022/0279332 | A1 * | 9/2022 | Jeong | H04W 48/08 |

* cited by examiner

MULTICONNECTIVITY FOR JOINT USER EQUIPMENT RELAYING

FIELD OF TECHNOLOGY

The following relates to wireless communications, including multiconnectivity for joint user equipment (UE) relaying.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, higher frequency bands (e.g., frequency range 2 (FR2)) may be utilized to improve communications. However, higher frequency band operations may be more susceptible to blockage (e.g., physical obstructions) and path loss. For example, a direct link between a UE and a base station may be impaired or blocked frequently, serving data rate or throughput may not be sufficient, or there may be a need for traffic offload. Providing additional or alternate paths for communication between a UE and a base station may increase diversity and therefore reliability in communications. In some examples, link diversity may also provide coverage enhancements and reduce power consumption.

SUMMARY

The described techniques relate to improved methods, systems, devices, and apparatuses that support multiconnectivity for joint user equipment (UE) relaying. Generally, the described techniques provide for configuring multiple UEs to act as relays for one another as part of a joint relay system. For example, a base station may have a direct link to two or more UEs and the two or more UEs may communicate with one another via sidelink. The base station may configure the two or more UEs with a relay configuration, where the relay configuration may jointly or separately configure one or more relay links (e.g., relay connections) between the UEs. The base station may transmit (e.g., via a control message, such as a radio resource control (RRC) message)) configuration information to one or more of the UEs, e.g., via a direct link or a relay link. For example, the base station may transmit configuration information for a relay link to a first UE via a direct link, and the first UE may transmit the relay configuration via sidelink to one or more other UEs that are to be configured as part of the joint relay system.

The base station may transmit a control message (e.g., downlink control information (DCI), media access control control element (MAC-CE), or the like) to one or more of the UEs in the joint system to indicate that the UE should activate the one or more relay links. The UEs in the joint relay system may communicate with one another and with the base station via the relay links in accordance with the relay configuration. For instance, a relay configuration may indicate information for a relay link to enable the first UE to transmit a data message to a base station via the relay link, e.g., by transmitting the data message to a second UE (e.g., via sidelink), and the second UE transmits the data message to the base station (e.g., via the direct link). In some examples, the control message may also be used to indicate resource grants for any of the sidelinks, relay links, or direct links. In some cases, the joint relay system may be used for multiple procedures, such as buffer status reporting, feedback transmission, or beam management, among other examples.

A method for wireless communication at a first user equipment (UE) is described. The method may include establishing a first access connection with a base station and a sidelink connection with a second UE, receiving, from the base station via the first access connection, configuration information for a first relay connection and a second relay connection, the first relay connection between the first UE and the base station via the second UE using the sidelink connection, and the second relay connection between the base station and the second UE via the first UE using the sidelink connection and the first access connection; receiving, in a control message from the base station, an indication that the first UE is to activate the first relay connection and the second relay connection; transmitting, based on the indication in the control message, one or more data messages to the base station on the first relay connection according to the received configuration information for the first relay connection; receiving one or more data messages from the second UE on the sidelink connection according to the second relay connection, and transmitting the one or more data messages from the second UE to the base station on the first connection according to the second relay connection.

An apparatus for wireless communication at a first UE is described. The apparatus may include a processor, memory coupled with the processor, and instructions stored in the memory. The instructions may be executable by the processor to cause the apparatus to establish a first access connection with a base station and a sidelink connection with a second UE, receive, from the base station via the first access connection, configuration information for a first relay connection and a second relay connection, the first relay connection between the first UE and the base station via the second UE using the sidelink connection, and the second relay connection between the base station and the second UE via the first UE using the sidelink connection and the first access connection; receive, in a control message from the base station, an indication that the first UE is to activate the first relay connection and the second relay connection; transmit, based on the indication in the control message, one or more data messages to the base station on the first relay connection according to the received configuration information for the first relay connection; receive one or more data messages from the second UE on the sidelink connection according to the second relay connection, and transmit the one or more data messages from the second UE to the base station on the first connection according to the second relay connection.

Another apparatus for wireless communication at a first UE is described. The apparatus may include means for establishing a first access connection with a base station and a sidelink connection with a second UE, means for receiving, from the base station via the first access connection, configuration information for a first relay connection and a second relay connection, the first relay connection between the first UE and the base station via the second UE using the sidelink connection, and the second relay connection between the base station and the second UE via the first UE using the sidelink connection and the first access connection, means for receiving, in a control message from the base station, an indication that the first UE is to activate the first relay connection and the second relay connection; means for transmitting, based on the indication in the control message, one or more data messages to the base station on the first relay connection according to the received configuration information for the first relay connection; means for receiving one or more data messages from the second UE on the sidelink connection according to the second relay connection, and means for transmitting the one or more data messages from the second UE to the base station on the first connection according to the second relay connection.

A non-transitory computer-readable medium storing code for wireless communication at a first UE is described. The code may include instructions executable by a processor to establish a first access connection with a base station and a sidelink connection with a second UE, receive, from the base station via the first access connection, configuration information for a first relay connection and a second relay connection, the first relay connection between the first UE and the base station via the second UE using the sidelink connection, and the second relay connection between the base station and the second UE via the first UE using the sidelink connection and the first access connection, receive, in a control message from the base station, an indication that the first UE is to activate the first relay connection and the second relay connection; transmit, based on the indication in the control message, one or more data messages to the base station on the first relay connection according to the received configuration information for the first relay connection; receive one or more data messages from the second UE on the sidelink connection according to the second relay connection, and transmit the one or more data messages from the second UE to the base station on the first connection according to the second relay connection.

Some examples of the method, apparatuses, and non-transitory computer-readable medium described herein may further include operations, features, means, or instructions for receiving, in a second control message from the base station via the first access connection and after transmitting the one or more data messages on the first relay connection, an indication that the first UE is to deactivate the first relay connection and transmitting one or more subsequent data messages to the base station on the first access connection.

Some examples of the method, apparatuses, and non-transitory computer-readable medium described herein may further include operations, features, means, or instructions for identifying a radio bearer associated with the first relay connection between the first UE and the base station, receiving an indication that the first UE is to deactivate the first relay connection, and determining, based on the receiving the indication that the first UE is to deactivate the first relay connection, that the radio bearer associated with the first relay connection may have switched to the first access connection with the base station.

Some examples of the method, apparatuses, and non-transitory computer-readable medium described herein may further include operations, features, means, or instructions for receiving an indication that the first UE is to deactivate the first relay connection, deactivating the first relay connection that is via the second UE in response to the received indication that the first UE is to deactivate the first relay connection, and maintaining the second relay connection after deactivating the first relay connection.

Some examples of the method, apparatuses, and non-transitory computer-readable medium described herein may further include operations, features, means, or instructions for receiving, separate from the control message including the indication that the first UE is to activate the first relay connection, a second control message including an indication that the first UE is to activate or deactivate the second relay connection.

In some examples of the method, apparatuses, and non-transitory computer-readable medium described herein, the control message includes the indication that the first UE is to activate the relay connection further includes an indication that at least the second relay connection is to be activated or deactivated.

In some examples of the method, apparatuses, and non-transitory computer-readable medium described herein, the indication of the control message includes an activation bitmap, each bit of the activation bitmap associated with a corresponding one of the first relay connection or the second relay connection.

In some examples of the method, apparatuses, and non-transitory computer-readable medium described herein, the control message includes the indication that the first UE is to activate the first relay connection further includes an indication that the first access connection with the base station is to be activated or deactivated.

Some examples of the method, apparatuses, and non-transitory computer-readable medium described herein may further include operations, features, means, or instructions for receiving, based on receiving the indication in the control message, one or more additional data messages from the base station on the first relay connection according to the received configuration information for the first relay connection.

In some examples of the method, apparatuses, and non-transitory computer-readable medium described herein, receiving the indication that the first UE is to activate the first relay connection and the second relay connection may include operations, features, means, or instructions for receiving the indication from the base station via the first access connection or from the base station via the sidelink connection.

Some examples of the method, apparatuses, and non-transitory computer-readable medium described herein may further include operations, features, means, or instructions for receiving a configuration identifying a format for grants of resources of the first relay connection and one or more of the first access connection or the sidelink connection and receiving, according to the received configuration, one or more of a downlink grant, an uplink grant, or a sidelink grant.

A method for wireless communication at a base station is described. The method may include establishing a first access connection with a first UE and a second access connection with a second UE, transmitting, to the first UE via the first access connection, configuration information for a first relay connection and a second relay connection, the first relay connection between the first UE and the base station, the first relay connection via the second UE using a sidelink connection between the first UE and the second UE and the second access connection between the base station and the second UE, and the second relay connection between the base station and the second UE via the first UE using the sidelink connection and the first access connection, transmitting, in a control message to the first UE, an indication that the first UE is to activate the first relay connection; receiving, based on the indication in the control message, one or more data messages from the first UE via the second UE on the first relay connection, and receiving, based on the indication in the control message, one or more data messages from the second UE via the first UE on the second relay connection.

An apparatus for wireless communication at a base station is described. The apparatus may include a processor, memory coupled with the processor, and instructions stored in the memory. The instructions may be executable by the processor to cause the apparatus to establish a first access connection with a first UE and a second access connection with a second UE, transmit, to the first UE via the first access connection, configuration information for a first relay connection and a second relay connection, the first relay connection between the first UE and the base station, the first relay connection via the second UE using a sidelink connection between the first UE and the second UE and the second access connection between the base station and the second UE, and the second relay connection between the base station and the second UE via the first UE using the sidelink connection and the first access connection, transmit, in a control message to the first UE, an indication that the first UE is to activate the first relay connection; receive, based on the indication in the control message, one or more data messages from the first UE via the second UE on the first relay connection, and receive, based on the indication in the control message, one or more data messages from the second UE via the first UE on the second relay connection.

Another apparatus for wireless communication at a base station is described. The apparatus may include means for establishing a first access connection with a first UE and a second access connection with a second UE, means for transmitting, to the first UE via the first access connection, configuration information for a first relay connection and a second relay connection, the first relay connection between the first UE and the base station, the first relay connection via the second UE using a sidelink connection between the first UE and the second UE and the second access connection between the base station and the second UE, and the second relay connection between the base station and the second UE via the first UE using the sidelink connection and the first access connection, means for transmitting, in a control message to the first UE, an indication that the first UE is to activate the first relay connection; means for receiving, based on the indication in the control message, one or more data messages from the first UE via the second UE on the first relay connection, and means for receiving, based on the indication in the control message, one or more data messages from the second UE via the first UE on the second relay connection.

A non-transitory computer-readable medium storing code for wireless communication at a base station is described. The code may include instructions executable by a processor to establish a first access connection with a first UE and a second access connection with a second UE, transmit, to the first UE via the first access connection, configuration information for a first relay connection and a second relay connection, the first relay connection between the first UE and the base station, the first relay connection via the second UE using a sidelink connection between the first UE and the second UE and the second access connection between the base station and the second UE, and the second relay connection between the base station and the second UE via the first UE using the sidelink connection and the first access connection, transmit, in a control message to the first UE, an indication that the first UE is to activate the first relay connection; receive, based on the indication in the control message, one or more data messages from the first UE via the second UE on the first relay connection, and receive, based on the indication in the control message, one or more data messages from the second UE via the first UE on the second relay connection.

In some examples of the method, apparatuses, and non-transitory computer-readable medium described herein, the configuration information for the first relay connection may be transmitted in a first configuration message and the method, apparatuses, and non-transitory computer-readable medium may include further operations, features, means, or instructions for transmitting a second configuration message including configuration information for the second relay connection.

Some examples of the method, apparatuses, and non-transitory computer-readable medium described herein may further include operations, features, means, or instructions for transmitting, in a second control message to the first UE via the first access connection and after receiving the one or more data messages on the first relay connection, an indication that the first UE is to deactivate the first relay connection and receiving one or more subsequent data messages from the first UE on the first access connection.

Some examples of the method, apparatuses, and non-transitory computer-readable medium described herein may further include operations, features, means, or instructions for transmitting an indication that the first UE is to deactivate the first relay connection and identifying that the second relay connection may be maintained.

Some examples of the method, apparatuses, and non-transitory computer-readable medium described herein may further include operations, features, means, or instructions for transmitting, separate from the control message including the indication that the first UE is to activate the first relay connection, a second control message including an indication that the first UE is to activate or deactivate the second relay connection.

In some examples of the method, apparatuses, and non-transitory computer-readable medium described herein, the control message includes the indication that the first UE is to activate the first relay connection further includes an indication that at least the second relay connection is to be activated or deactivated.

In some examples of the method, apparatuses, and non-transitory computer-readable medium described herein, the control message includes the indication that the first UE is to activate the first relay connection further includes an indication that the first access connection with the base station is to be activated or deactivated.

In some examples of the method, apparatuses, and non-transitory computer-readable medium described herein, transmitting the indication that the first UE is to activate the first relay connection may include operations, features, means, or instructions for transmitting the indication to the first UE via the first access connection or to the first UE via the second access connection.

DETAILED DESCRIPTION

Figure 1:
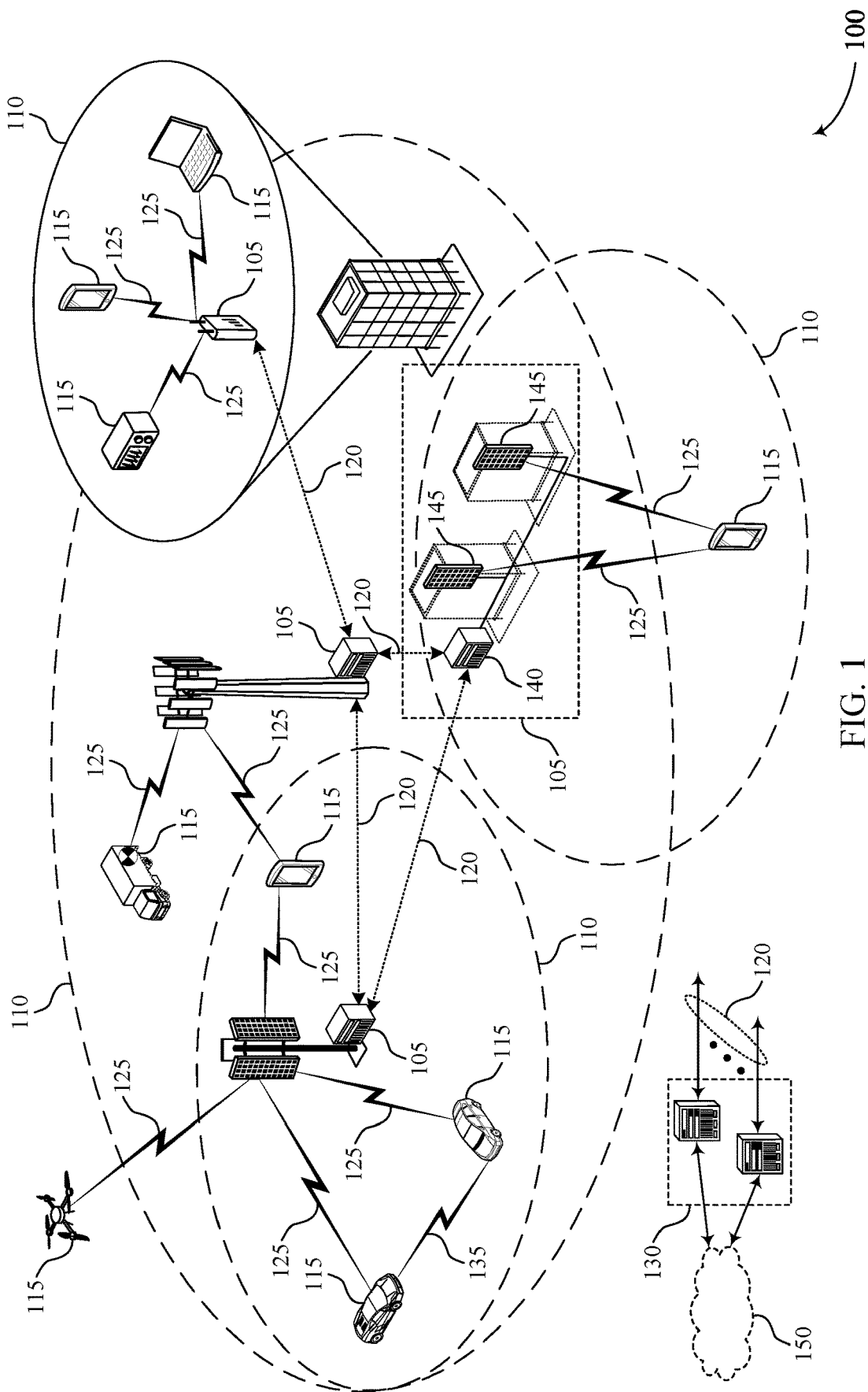
FIG. 1 illustrates an example of a wireless communications system that supports multiconnectivity for joint user equipment (UE) relaying in accordance with aspects of the present disclosure.

In some wireless communications systems, such as new radio (NR) systems, a user equipment (UE) may communicate using higher frequency bands to improve performance and meet various reliability and quality of service (QoS) standards. For example, frequency range 2 (FR2) may be capable of supporting high throughput and low latency communications. FR2 may also support communications with many devices simultaneously due to inherently broad bandwidths and high spatial multiplexing gains associated with the frequency range (e.g., millimeter wave (mmW)). In some cases, however, higher frequency band operations are more susceptible to blockage (e.g., physical obstructions) and path loss. Additionally, wireless devices communicating over higher frequency bands may consume power at a rate that is undesirable in the wireless network.

The susceptibility of higher frequency band operations to path loss and blockages, as well as the accompanying power consumption, may be mitigated through link diversification. As described herein, UEs and base stations utilizing higher frequency bands may establish a joint relaying system to distribute communications across multiple communication links (e.g., across multiple connections, such as access connections and sidelink connections) via relays specified by the network (e.g., configured by a base station). For example, a first UE and a second UE communicating via a sidelink connection may diversify their respective communications with a base station through direct links (e.g., access connections) and relay links (e.g., relay connections). The base station may transmit (e.g., as part of a control message, such as a radio resource control (RRC) message) configuration information to one or both UEs for one or more relay connections, such as a first relay connection between the first UE and the base station via the second UE using the sidelink connection and a second relay connection between the second UE and the base station via the first UE. For example, the base station may configure the second UE to act as a relay for the first UE, e.g., due to latency spikes at the second UE caused by a physical blockage. The base station may also transmit, to the first UE and the second UE, an indication that the respective UE is to activate the respective relay connection. The first UE and the second UE may therefore each communicate with the base station using an indirect link via the first relay connection and the second relay connection, respectively, in addition to or instead of the direct link with the base station. By splitting up the communications (e.g., diversifying), the first UE and the second UE may circumvent the physical blockage while maintaining low latencies.

In some examples, multiple relay connections may be configured, activated, or deactivated, or some combination thereof, based on an indication transmitted by the base station. For instance, the base station may transmit, to one or more UEs, configuration information for multiple relay connections, where each respective relay connection may be configured independently or jointly. That is, the base station may transmit a single control message including configuration information for multiple relay connections to be configured simultaneously. Additionally or alternatively, the base station may transmit separate control messages where each control message is for a respective relay connection and includes corresponding configuration information. As another example, the base station may transmit, to the one or more UEs, a control message that includes an activation indication or a deactivation indication for each respective relay connection.

Aspects of the disclosure are initially described in the context of wireless communications systems and a process flow. Aspects of the disclosure are further illustrated by and described with reference to apparatus diagrams, system diagrams, and flowcharts that relate to multiconnectivity for joint UE relaying.

FIG. 1 illustrates an example of a wireless communications system 100 that supports multiconnectivity for joint UE relaying in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, communications in the wireless communications system 100, such as communications using higher frequency bands, may experience path loss, blockages, low throughput, increased power consumption, or other degradations in performance. Accordingly, devices in the wireless communications system 100 may increase reliability, enhance coverage, and reduce power consumption by increasing link diversity (e.g., using varying or an increased number of links). According to the techniques described herein, UEs 115 and base stations 105 may establish a joint relaying system by which communications may be distributed across multiple communication links (e.g., communication links 125, communication links 135) via one or more relay connections. A base station 105 may configure the one or more relay connections such that a UE 115 may communicate with the base station 105 directly (e.g., using a communication link 125) and/or indirectly (e.g., via a relay connection). The relay connection may utilize existing sidelink connections (e.g., communication links 135) between the UE 115 and other UEs 115. That is, the UE 115 may communicate with the base station 105 by way of another UE 115 that is configured to act as a relay.

For example, a first UE 115 may establish an access connection (e.g., a communication link 125) with a base station 105 and a sidelink connection (e.g., a communication link 135) with a second UE 115. The base station 105 may configure the second UE 115 to act as a relay for the first UE 115 and may transmit, to the first UE 115, a control message that indicates configuration information for a first relay connection. The relay connection may be between the first UE 115 and the base station 105 via the second UE 115, e.g., using the sidelink connection between the first UE 115 and the second UE 115. The UE 115 may activate the first relay connection, for example, based on receiving an indication to do so from the base station 105. The first UE 115 may communicate with the base station 105 using the relay connection; that is, the first UE 115 may transmit a message (e.g., a data message) to the second UE 115 and the second UE 115 may transmit the message to the base station 105. Additionally, the base station 105 may configure multiple relay connections simultaneously. For instance, in addition to the first relay connection, the base station 105 may configure a second relay connection such that the first UE 115 may act as a relay for the second UE 115. That is, the second relay connection may be between the second UE 115 and the base station 105 via the first UE 115, e.g., using the sidelink connection between the first UE 115 and the second UE 115. In this case, the base station 105 may transmit configuration information for both the first and second relay connections jointly or separately. That is, the base station may use the same configuration information to configure both relay connections simultaneously or may configure the relay connections independently, and may transmit the configuration information to the first and second UEs 115 directly or indirectly. For instance, the base station may transmit, to the first UE 115 via the communication link 125, a control message including configuration information used to configure both the first and second relay connections. The first UE 115 may subsequently transmit the configuration information to the second UE via the sidelink connection (e.g., communication link 135). Alternatively, the base station 105 may transmit the control message to both UEs 115 directly (e.g., via respective access connections).

Figure 2:
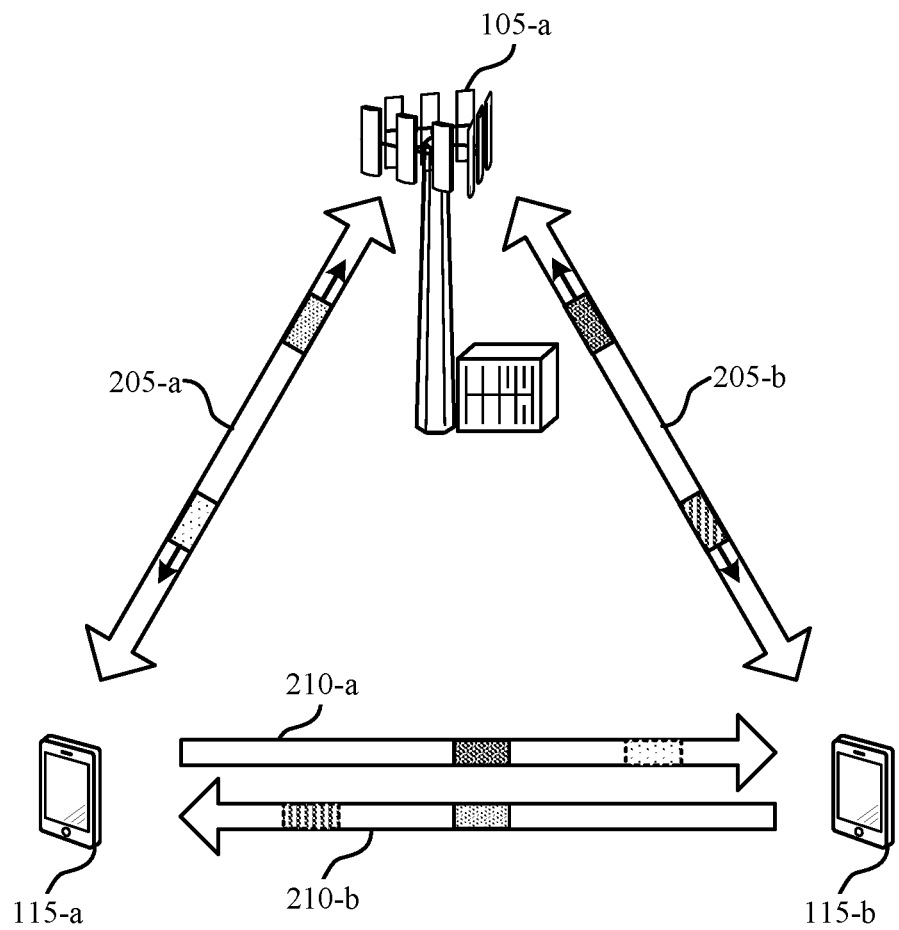
FIG. 2 illustrates an example of a wireless communications system that supports multiconnectivity for joint UE relaying in accordance with aspects of the present disclosure.

FIG. 2 illustrates an example of a wireless communications system 200 that supports multiconnectivity for joint UE relaying in accordance with aspects of the present disclosure. The wireless communications system 200 may include a base station 105-a, a UE 115-a, and a UE 115-b which may be examples of a base station 105 and UEs 115 as described with reference to FIG. 1. The base station 105-a may communicate with the UEs 115-a and 115-b via established communication links 205-a and 205-b, respectively. The UEs 115-a and 115-b may communicate with each other via established sidelinks 210-a and 210-b, respectively.

As described herein, the wireless communications system 200 may be an example of a joint relay system for the UEs 115 and the base station 105-a. The base station 105-a may configure one or more relay connections for the UE 115-a, the UE 115-b, or both, to increase link diversity in the wireless communications system 200. For example, a first relay connection may be configured (e.g., by the base station 105-a) for the UE 115-a to communicate with the base station 105-a via the UE 115-b. The UE 115-b may act as a relay by receiving messages from the UE 115-a on the sidelink 210-a and transmitting the messages to the base station 105-a on the communication link 205-b. Additionally, a second relay connection may be configured (e.g., by the base station 105-a) for the UE 115-b to communicate with the base station 105-a via the UE 115-a, where the UE 115-a may act as a relay by receiving messages from the UE 115-b on the sidelink 210-b and transmitting the messages to the base station 105-a on the communication link 205-a. The UE 115-a may therefore communicate with the base station 105-a via a direct link (e.g., an access connection), such as the communication link 205-a, or via an indirect link, such as the relay connection including sidelink 210-a and communication link 205-b. It is to be noted that although the example illustrated in FIG. 2 utilize two UEs 115 and one base station 105, the techniques described herein may be applied to any number of relay connections between any number of devices.

The base station 105-a may transmit, to the UEs 115, configuration information for the first relay connection and the second relay connection. The first and second relay connections may be configured jointly (e.g., simultaneously) or separately. For example, the first relay connection may be configured between the UE 115-a and the base station 105-a via the UE 115-b, and the second relay connection may be configured between the UE 115-b and the base station 105-a. The base station 105-a may transmit configuration information (e.g., a configuration message) for the first and second relay connections in a same message, such as a control message 215 (e.g., which may be an example of an RRC message), or in separate messages for each relay connection (e.g., configuration information for each respective relay connection is transmitted separately). For example, the base station 105-a may transmit configuration information for the first relay connection in a first control message 215 and configuration information for the second relay connection in a second control message 215.

In some examples, the base station 105-a may transmit the configuration information for the one or more relay connections to the UEs 115 via their respective communication links 205 (e.g., via respective access links). Additionally or alternatively, the base station 105-a may transmit the configuration information to one UE 115 and the UE 115 may transmit the configuration information to the other UE 115. In the example of FIG. 2, the base station 105-a may transmit configuration information for the first relay connection, the second relay connection, or both in control messages 215 directly to the UEs 115. The base station 105-a may transmit a control message 215-a to the UE 115-a and a control message 215-b to the UE 115-b. As an alternative example, the base station 105-a may utilize the relay connections to convey the configuration information. For instance, the base station 105-a may transmit control message 215-a to UE 115-a and the UE 115-a may transmit relayed control message 225-a to UE 115-b using the sidelink 210-a. Alternatively, the base station 105-a may transmit control message 215-b to UE 115-b, and the UE 115-b may transmit relayed control message 225-b to UE 115-a using the sidelink 210-b.

The UEs 115 and the base station 105-a may configure the relay connections according to the associated configuration information. Upon configuration, the relay connections may be activated or deactivated, e.g., jointly or separately. For example, after transmitting the configuration information for a relay connection, the base station 105-a may transmit, to one or more associated UEs 115, an indication (e.g., via L1 or L2 control signaling, such as a control message) that the relay connection is to be activated. Additionally or alternatively, the base station 105-a may transmit, to the one or more associated UEs 115, an indication that an active relay connection is to be deactivated. In some cases, the indication may be received by a UE via a direct link (e.g., a communication link 205) or via the relay connection (e.g., a sidelink 210). For instance, the UE 115-a may receive, from the base station 105-a, an indication that a relay connection is to be deactivated via the communication link 205-a or via the sidelink 210-b.

In some examples, the base station 105-a may indicate activation/deactivation information for multiple relay connections simultaneously. For instance, the base station 105-a may transmit a control message that includes an activation bitmap, where each bit of the activation bitmap corresponds to a relay connection. The value of a bit may indicate whether the corresponding relay connection is to be activated or deactivated. The base station 105-a may transmit the activation bitmap to one or more associated UEs 115, such that the UEs 115 may activate or deactivate the corresponding relay connections based on receiving the activation bitmap.

In the example of FIG. 2, the relay connections may be separately activated. For instance, the base station 105-a may transmit a control message (e.g., different from the control messages 215), such as a MAC-CE, a DCI, or the like, to the UE 115-a including an indication that the UE 115-a is to activate the first relay connection. The UE 115-a may activate the first relay connection based on receiving the indication. The base station 105-a may transmit, to the UE 115-b, a control message including an indication that the UE 115-b is to activate the second relay connection, and the UE 115-b may activate the second relay connection based on receiving the indication. In some examples, the indication that a relay connection is to be activated may also include an indication that a communication link 205 with the base station 105-a is to be deactivated. For example, the UE 115-a may receive, from the base station 105-a, a control message including an indication that the first relay connection (e.g., via the sidelink 210-a and the communication link 205-b) is to be activated and an indication that the communication link 205-a is to be deactivated. In such examples, the UE 115-a may transmit and receive subsequent communications from the base station 105-*a* via the first relay connection (e.g., via the UE 115-*b* using the sidelink 210-*b*).

Deactivation of a relay connection may not impact other active relay or sidelink connections. For example, if the first relay connection in FIG. 2 is deactivated, the UE 115-*b* may no longer serve as a relay for the UE 115-*a*, but the UE 115-*a* may continue to act as a relay for the UE 115-*b* according to the second relay connection. That is, the UE 115-*a* may maintain the second relay connection after deactivating the first relay connection. Further, if a relay connection is deactivated, the sidelink corresponding to the same physical link but a different logical link may not be impacted. In some cases, a radio bearer (e.g., a split bearer) mapping to the relay connection may be automatically routed to another active connection. For example, the UE 115-*a* may identify a radio bearer mapping to the first relay connection (e.g., via sidelink 210-*a* and the communication link 205-*b*). Upon deactivation of the first relay connection, the UE 115-*a* may determine that the radio bearer has switched to the communication link 205-*a*.

Based on the configuration information and the activation (or deactivation) indications, the UEs 115 and the base station 105-*a* may communicate using the relay connections. For instance, the UEs 115 may transmit and receive one or more data messages 220 to and from the base station 105-*a* via the corresponding relay connections. In the example of FIG. 2, the UE 115-*b* may relay a data message 220-*a* to the base station 105-*a* according to the first relay connection. That is, the UE 115-*a* may transmit the data message 220-*a* to the UE 115-*b* via the sidelink 210-*a*, and the UE 115-*b* may transmit the data message 220-*a* to the base station 105-*a* using the communication link 205-*b*. The UE 115-*a* may similarly relay a data message 220-*b* to the base station 105-*a* according to the second relay connection. The UE 115-*b* may transmit, and the UE 115-*a* may receive, the data message 220-*b* via the sidelink 210-*b*. The UE 115-*a* may transmit the data message to the base station 105-*a* via the communication link 205-*a*.

In some cases, e.g., for increased link diversity and reliability, the UEs 115 may communicate with the base station 105-*a* using both the relay connections and the communication links 205. For example, the first UE 115-*a* may determine to transmit a data message 220-*a* to the base station 105-*a* via the first relay connection and the communication link 205-*a* to increase the likelihood that the base station 105-*a* receives the data message 220-*a*. Thus, if the communication link 205-*a* experiences degradation, such as interference or a blockage, the data message 220-*a* may still be received by the base station 105-*a* via the first relay connection. Alternatively, if one or both of the sidelink 210-*a* and the communication link 205-*b* (i.e., the links included in the first relay connection) experiences degradation, the data message 220-*a* may be received by the base station 105-*a* via the communication link 205-*a*. In some cases, the UE 115-*a* may select a path for the data message 220-*a*, e.g., based on channel conditions. For instance, the UE 115-*a* may determine that the first relay connection may have less interference as compared to the communication link 205-*a*, and may transmit the data message 220-*a* to the base station 105-*a* using the first relay connection.

In some examples, the UEs 115 and base station 105-*a* may use the relay connections to communicate information other than data messages. For instance, the base station 105-*a* may use the relay connections to transmit (e.g., using L1/L2 signaling, such as DCI), to the UEs 115, resource grants for the communication links 205, the sidelinks 210, or both. As an example, the base station 105-*a* may transmit, to the UE 115-*a*, a configuration that identifies a format for resource grants, e.g., of the relay connection, the communication link 205-*a*, the sidelink 210-*a*, or some combination thereof. The configuration may be transmitted using an RRC message. In some examples, the configuration may indicate the link for which the resource grant is to be used. The base station 105-*a* may transmit, to the UE 115-*a* and in accordance with the configuration, one or more resource grants (e.g., downlink grants, uplink grants, sidelink grants, or some combination thereof) for one or more of the links. For instance, the base station 105-*a* may transmit a downlink grant and a sidelink grant, e.g., for a transmission to be received by the UE 115-*a* via the communication link 205-*a* and for communications via the sidelink 210-*a*, respectively.

In some examples, the resource grant(s) may be a joint grant to be used for the relay connection. For instance, the UE 115-*a* may serve as a relay for the UE 115-*b* in the second relay connection. The base station 105-*a* may transmit a message to the UE 115-*b*, and the UE 115-*b* may transmit a message to the base station 105-*a*, via the UE 115-*a* according to a joint grant. That is, the UE 115-*a* may receive a downlink grant for a downlink transmission to be received from the base station 105-*a*. The UE 115-*a* may additionally receive a sidelink grant for a sidelink transmission using the sidelink 210-*a*. Thus, the UE 115-*a* may receive the downlink transmission on the communication link 205-*a* according to the downlink grant and relay the downlink transmission to the UE 115-*b* according to the sidelink grant on the sidelink 210-*a*. Further, the UE 115-*a* may receive a sidelink grant for the UE 115-*b* to use (e.g., to communicate with the base station 105-*a* via the UE 115-*a*) and may relay the sidelink grant to the UE 115-*b*. The UE 115-*b* may transmit a message to the UE 115-*a* on the sidelink 210-*b* according to the relayed sidelink grant, such that the UE 115-*a* may relay the message to the base station 105-*a*.

The techniques described herein may further be applied to other communications and procedures in the wireless communications system 200. For example, the UEs 115 and the base station 105-*a* may utilize relay connections to perform beam management, communicate HARQ feedback, channel state information (CSI) (e.g., periodic or aperiodic CSI feedback), buffer status reports (BSRs), power headroom reports (PHRs), or the like, for the UEs 115 individually or jointly. For example, for the second relay connection, the UE 115-*a* may transmit, to the UE 115-*b*, a BSR associated with data held in a buffer to be relayed to the UE 115-*b*. In such examples, the BSR may be mapped to the corresponding link. That is, the BSR (e.g., the MAC-CE used to transmit the BSR) may indicate which relay or link (e.g., relay connection, sidelink 210, communication link 205, etc.) the BSR is associated with. As a non-limiting example, the BSR may be associated with the sidelink 210-*a* or the second relay connection. Alternatively, the BSR may be associated with data to be relayed from UE 115-*a* to UE 115-*b*. In some cases, the BSR may be for multiple relay connections. For instance, the UE 115-*b* may transmit a BSR to the UE 115-*a* that indicates data held in a buffer to be relayed to the UE 115-*a*. The UE 115-*a* may forward the BSR to the base station 105-*a* in addition to a BSR that indicates data held in a buffer to be relayed to the UE 115-*b*. The base station 105-*a* may thus be informed of the status of both UEs 115 that are acting as relays simultaneously.

Figure 3:
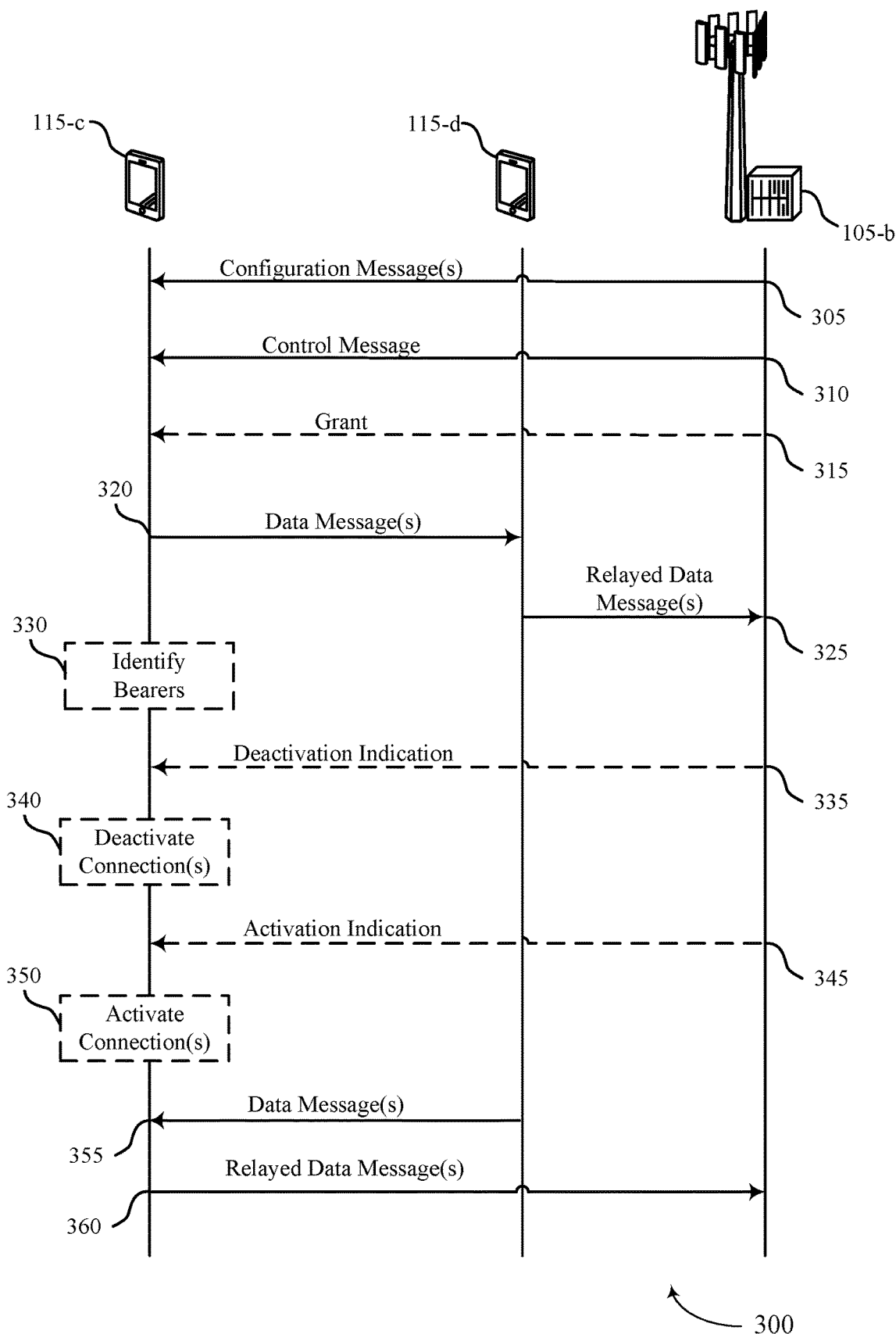
FIG. 3 illustrates an example of a process flow that supports multiconnectivity for joint UE relaying in accordance with aspects of the present disclosure.

FIG. 3 illustrates an example of a process flow 300 that supports multiconnectivity for joint UE relaying in accordance with aspects of the present disclosure. In some examples, the process flow 300 may implement aspects of wireless communications systems 100 or 200. For example, process flow 300 may include a base station 105-*b*, a UE 115-*c*, and a UE 115-*d*, which may be examples of corresponding wireless devices as described herein. In the following description of the process flow 300, the operations between the UEs 115 and the base station 105-*b* may be transmitted in a different order than the order shown, or the operations performed by the UEs 115 and the base station 105-*b* may be performed in different orders or at different times. Certain operations may also be left out of the process flow 300, or other operations may be added to the process flow 300. While the UEs 115 and the base station 105-*b* are shown performing operations of process flow 300, any wireless device may perform the operations shown. Further, while FIG. 3 illustrates an example of communications between UEs 115 and a base station 105-*b*, the techniques described herein may be applied to communications between any number of wireless devices.

In the process flow 300, the base station 105-*b* may establish access connections (e.g., direct links) with the UEs 115-*c* and 115-*d*, respectively. The UE 115-*c* may establish a sidelink connection with the UE 115-*d*.

At 305, the base station 105-*b* may transmit, and the UE 115-*c* may receive, a message indicating configuration information for a first relay connection between the UE 115-*c* and the base station 105-*b* and a second relay connection between the UE 115-*d* and the base station 105-*b* (e.g., via the sidelink connection). The message may be an example of a configuration message, a control message, or the like. In some examples, the message may include configuration information for one or more additional relay connections. In some cases, at 305, the base station 105-*b* may transmit, and the UE 115-*c* may receive, a separate configuration message for each relay connection that is to be configured. That is, the base station 105-*b* may transmit one or more additional messages indicating configuration information for one or more additional respective relay connections.

At 310, the base station 105-*b* may transmit, and the UE 115-*c* may receive, a control message including an indication that the UE 115-*c* is to activate the first relay connection and the second relay connection. The control message may be received by the UE 115-*c* via the access connection with the base station 105-*b* or the first relay connection (e.g., via the UE 115-*d* using the sidelink connection). In some cases, the control message may further include an indication that one or more other relay connections are to be activated or deactivated. For example, the control message may include an indication that another relay connection (e.g., a third previously configured and previously activated relay connection) is to be deactivated.

In some examples, the control message may include an activation bitmap such that each bit of the activation bitmap is associated with a corresponding relay connection. Continuing the example used above, the control message may include an activation bitmap corresponding to the first relay connection, the second relay connection, and the third relay connection. The bit associated with the first relay connection may be set to a value that indicates that the UE 115-*c* is to activate the first relay connection and the bit associated with the second relay connection may be set to a value that indicates that the UE 115-*c* is to activate the second relay connection. The bit associated with the third relay connection may be set to a value that indicates that the UE 115-*c* is to deactivate the third relay connection.

In some cases, the control message received at 310 may further include an indication that the UE 115-*c* is to deactivate the access connection (e.g., the direct link) with the base station 105-*b*.

At 315, the base station 105-*b* may transmit, and the UE 115-*c* may receive, a grant indicating resources. For example, the UE 115-*c* may receive a configuration that identifies a format for resource grants of the first relay connection, the second relay connection, the access connection with the base station 105-*b*, the sidelink connection, or some combination thereof. The UE 115-*c* may receive a downlink grant, a sidelink grant, or an uplink grant, based on the configuration and/or the format. For instance, if the UE 115-*c* receives a configuration that identifies a resource grant format for resources of the relay connection and the sidelink connection, the UE 115-*c* may also receive a sidelink grant indicating resources to use on the relay connection via sidelink connection.

At 320, the UE 115-*c* may transmit one or more data messages to the base station 105-*b* on the first relay connection. That is, at 320, the UE 115-*c* may transmit the one or more data messages to the UE 115-*d* using the sidelink connection in accordance with the configuration information associated with the first relay connection. At 325, the UE 115-*d* may transmit the one or more data messages to the base station 105-*b* on the access connection between the base station 105-*b* and the UE 115-*d* in accordance with the first relay connection.

At 330, the UE 115-*c* may identify one or more radio bearers associated with the one or more relay connections, such as a first radio bearer associated with the first relay connection.

At 335, the base station 105-*b* may transmit, and the UE 115-*c* may receive, an indication that the first relay connection is to be deactivated (e.g., by the UE 115-*c*). The indication may be included as part of a control message (e.g., a second control message different than the control message received at 310) and may be received by the UE 115-*c* via the connection with the base station 105-*b* or the first relay connection (e.g., via the UE 115-*d* using the sidelink connection).

At 340, the UE 115-*c* may deactivate the first relay connection, for example, in response to the indication received at 335. In some examples, e.g., if the UE 115-*c* identified a radio bearer associated with the first relay connection at 330, the UE 115-*c* may determine that the radio bearer has switched to the connection (e.g., the direct link) with the base station 105-*b*. After deactivating the first relay connection, the UE 115-*c* may transmit subsequent data messages to the base station 105-*b* via the access connection with the base station 105-*b*. The UE 115-*c* may maintain other relay connections (e.g., the second relay connection) despite deactivating the first relay connection; that is, deactivating a relay connection may not have an effect on other, active relay connections.

In some examples, the base station 105-*b* may transmit, and the UE 115-*c* may receive, a separate activation indication for one or more relay connections. For example, at 310, the UE 115-*c* may receive an indication to activate the first relay connection, and at 345, the UE 115-*c* may receive an indication to activate the second relay connection. At 350, the UE 115-*c* may activate the second relay connection.

At 355, based on receiving the indication to activate the second relay connection, the UE 115-*c* may receive one or more data messages from the UE 115-*d* according to the second relay connection (e.g., using the sidelink connection). At 360, the UE 115-*c* may transmit the one or more data messages to the base station 105-*b* on the connection to the base station 105-*b* according to the second relay connection.

Figure 4:
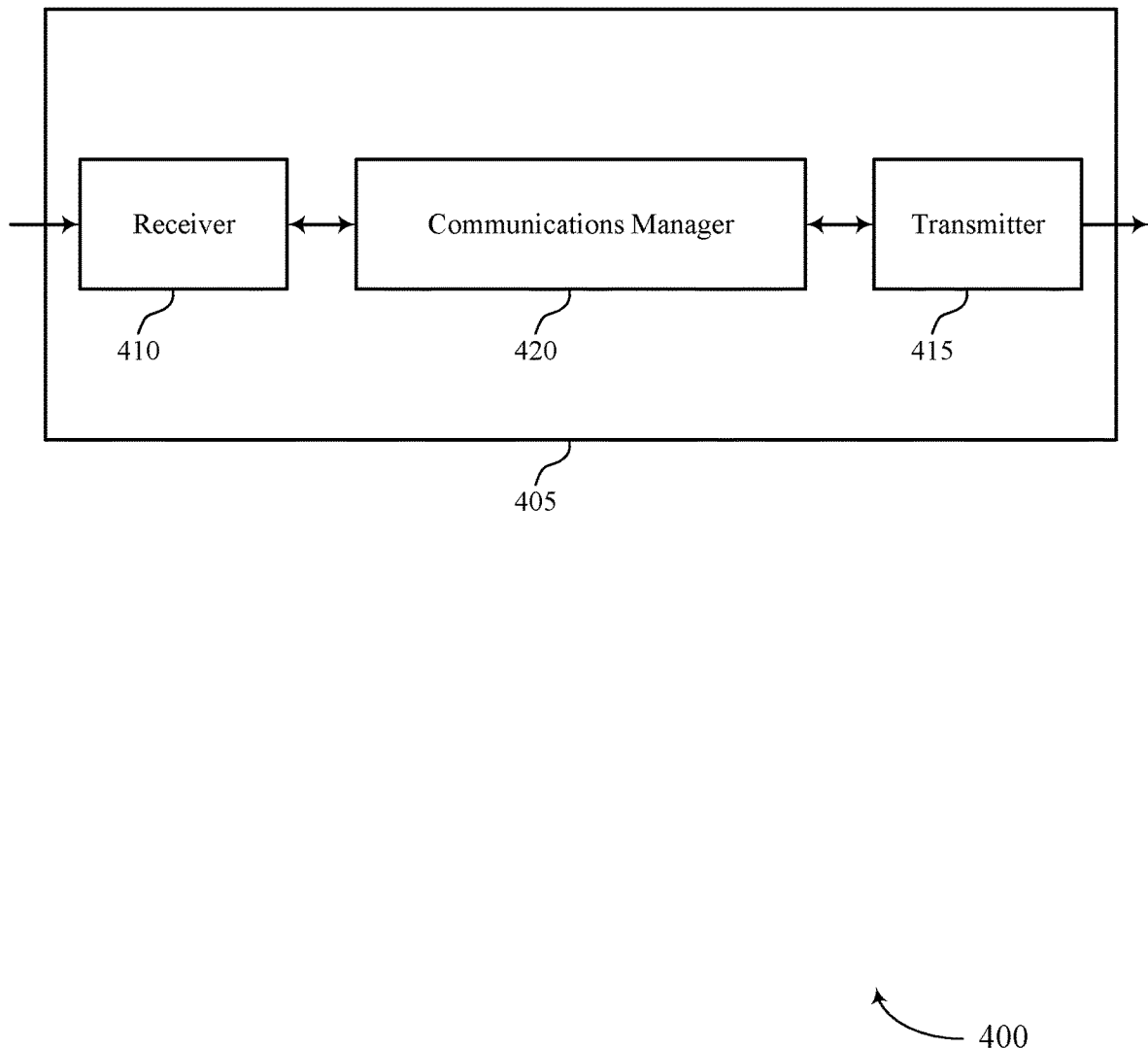
FIGS. 4 and 5 show block diagrams of devices that support multiconnectivity for joint UE relaying in accordance with aspects of the present disclosure.

FIG. 4 shows a block diagram 400 of a device 405 that supports multiconnectivity for joint UE relaying in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to multiconnectivity for joint UE relaying). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to multiconnectivity for joint UE relaying). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of multiconnectivity for joint UE relaying as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a first UE in accordance with examples as disclosed herein. For example, the communications manager 420 may be configured as or otherwise support a means for establishing a first access connection with a base station and a sidelink connection with a second UE. The communications manager 420 may be configured as or otherwise support a means for receiving, from the base station via the first access connection, configuration information for a first relay connection and a second relay connection, the first relay connection between the first UE and the base station via the second UE using the sidelink connection, and the second relay connection between the base station and the second UE via the first UE using the sidelink connection and the first access connection. The communications manager 420 may be configured as or otherwise support a means for receiving, in a control message from the base station, an indication that the first UE is to activate the first relay connection and the second relay connection. The communications manager 420 may be configured as or otherwise support a means for transmitting, based on the indication in the control message, one or more data messages to the base station on the first relay connection according to the received configuration information for the first relay connection. The communications manager 420 may be configured as or otherwise support a means for receiving one or more data messages from the second UE on the sidelink connection according to the second relay connection. The communications manager 420 may be configured as or otherwise support a means for transmitting the one or more data messages from the second UE to the base station on the first connection according to the second relay connection.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for using established connections as part of a joint relay system. The device 405 may communicate with other devices using one or more links of the joint relay, which may enable the device 405 to select or aggregate communication links to increase communications reliability. Further, increased link diversity supported by the techniques described herein may reduce power consumption at the device 405.

Figure 5:
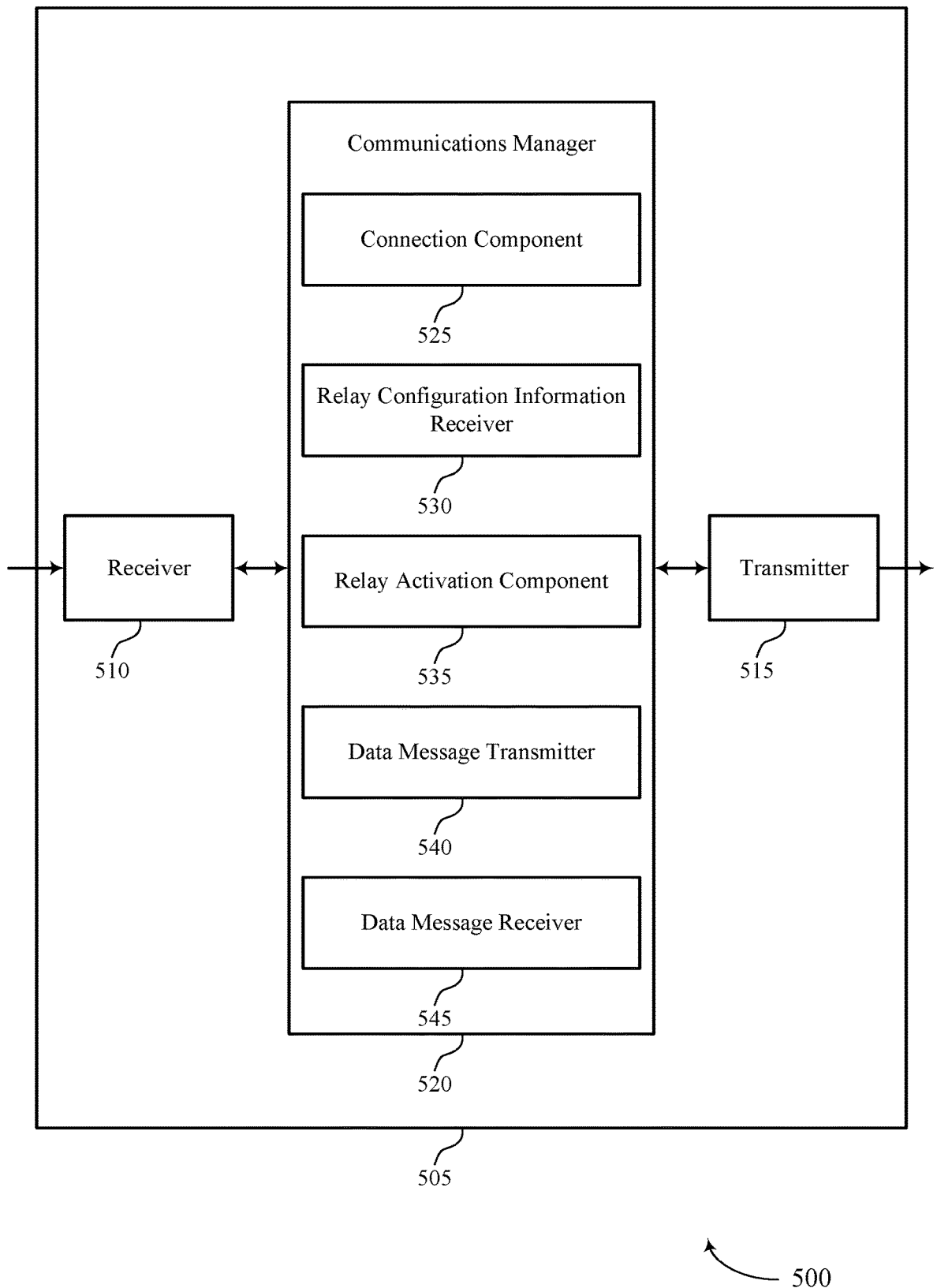

FIG. 5 shows a block diagram 500 of a device 505 that supports multiconnectivity for joint UE relaying in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to multiconnectivity for joint UE relaying). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to multiconnectivity for joint UE relaying). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of multiconnectivity for joint UE relaying as described herein. For example, the communications manager 520 may include a connection component 525, a relay configuration information receiver 530, a relay activation component 535, a data message transmitter 540, a data message receiver 545, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first UE in accordance with examples as disclosed herein. The connection component 525 may be configured as or otherwise support a means for establishing a first access connection with a base station and a sidelink connection with a second UE. The relay configuration information receiver 530 may be configured as or otherwise support a means for receiving, from the base station via the first access connection, configuration information for a first relay connection and a second relay connection, the first relay connection between the first UE and the base station via the second UE using the sidelink connection, and the second relay connection between the base station and the second UE via the first UE using the sidelink connection and the first access connection. The relay activation component 535 may be configured as or otherwise support a means for receiving, in a control message from the base station, an indication that the first UE is to activate the first relay connection and the second relay connection. The data message transmitter 540 may be configured as or otherwise support a means for transmitting, based on the indication in the control message, one or more data messages to the base station on the first relay connection according to the received configuration information for the first relay connection. The data message receiver 545 may be configured as or otherwise support a means for receiving one or more data messages from the second UE on the sidelink connection according to the second relay connection. The data message transmitter 540 may be configured as or otherwise support a means for transmitting the one or more data messages from the second UE to the base station on the first connection according to the second relay connection.

Figure 6:
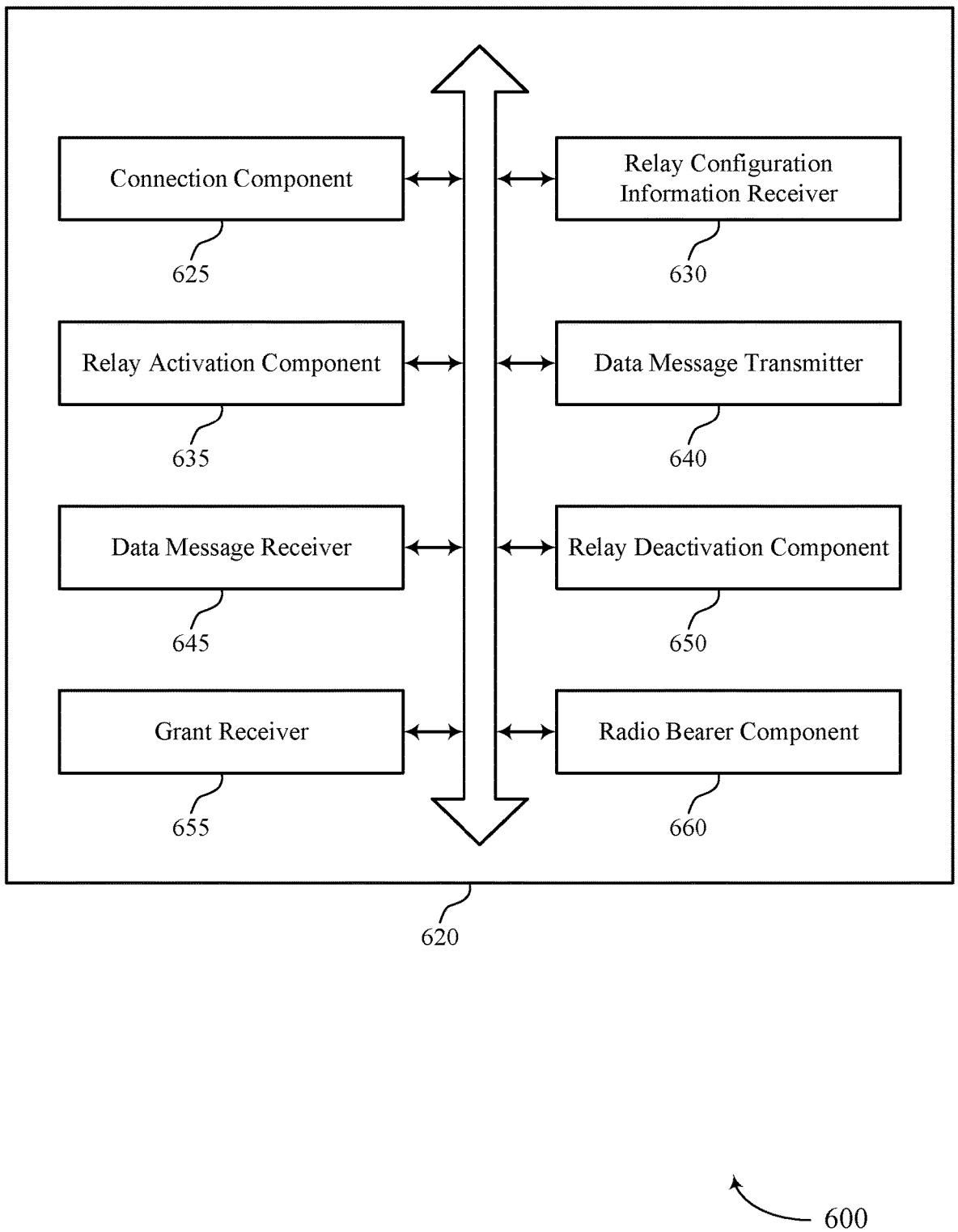
FIG. 6 shows a block diagram of a communications manager that supports multiconnectivity for joint UE relaying in accordance with aspects of the present disclosure.

FIG. 6 shows a block diagram 600 of a communications manager 620 that supports multiconnectivity for joint UE relaying in accordance with aspects of the present disclosure. The communications manager 620 may be an example of aspects of a communications manager 420, a communications manager 520, or both, as described herein. The communications manager 620, or various components thereof, may be an example of means for performing various aspects of multiconnectivity for joint UE relaying as described herein. For example, the communications manager 620 may include a connection component 625, a relay configuration information receiver 630, a relay activation component 635, a data message transmitter 640, a data message receiver 645, a relay deactivation component 650, a grant receiver 655, a radio bearer component 660, or any combination thereof. Each of these components may communicate, directly or indirectly, with one another (e.g., via one or more buses).

The communications manager 620 may support wireless communication at a first UE in accordance with examples as disclosed herein. The connection component 625 may be configured as or otherwise support a means for establishing a first access connection with a base station and a sidelink connection with a second UE. The relay configuration information receiver 630 may be configured as or otherwise support a means for receiving, from the base station via the first access connection, configuration information for a first relay connection and a second relay connection, the first relay connection between the first UE and the base station via the second UE using the sidelink connection, and the second relay connection between the base station and the second UE via the first UE using the sidelink connection and the first access connection. The relay activation component 635 may be configured as or otherwise support a means for receiving, in a control message from the base station, an indication that the first UE is to activate the first relay connection and the second relay connection. The data message transmitter 640 may be configured as or otherwise support a means for transmitting, based on the indication in the control message, one or more data messages to the base station on the first relay connection according to the received configuration information for the first relay connection. The data message receiver 645 may be configured as or otherwise support a means for receiving one or more data messages from the second UE on the sidelink connection according to the second relay connection. In some examples, the data message transmitter 640 may be configured as or otherwise support a means for transmitting the one or more data messages from the second UE to the base station on the first connection according to the second relay connection.

In some examples, the relay deactivation component 650 may be configured as or otherwise support a means for receiving, in a second control message from the base station via the first access connection and after transmitting the one or more data messages on the first relay connection, an indication that the first UE is to deactivate the first relay connection. In some examples, the data message transmitter 640 may be configured as or otherwise support a means for transmitting one or more subsequent data messages to the base station on the first access connection.

In some examples, the radio bearer component 660 may be configured as or otherwise support a means for identifying a radio bearer associated with the first relay connection between the first UE and the base station. In some examples, the relay deactivation component 650 may be configured as or otherwise support a means for receiving an indication that the first UE is to deactivate the first relay connection. In some examples, the radio bearer component 660 may be configured as or otherwise support a means for determining, based on the receiving the indication that the first UE is to deactivate the first relay connection, that the radio bearer associated with the first relay connection has switched to the first access connection with the base station.

In some examples, the relay deactivation component 650 may be configured as or otherwise support a means for receiving an indication that the first UE is to deactivate the first relay connection. In some examples, the relay deactivation component 650 may be configured as or otherwise support a means for deactivating the first relay connection that is via the second UE in response to the received indication that the first UE is to deactivate the first relay connection. In some examples, the connection component 625 may be configured as or otherwise support a means for maintaining the second relay connection after deactivating the first relay connection.

In some examples, the relay activation component 635 may be configured as or otherwise support a means for receiving, separate from the control message including the indication that the first UE is to activate the first relay connection, a second control message including an indication that the first UE is to activate or deactivate the second relay connection.

In some examples, the control message includes the indication that the first UE is to activate the relay connection further includes an indication that at least the second relay connection is to be activated or deactivated.

In some examples, the indication of the control message includes an activation bitmap, each bit of the activation bitmap associated with a corresponding one of the first relay connection or the second relay connection.

In some examples, the control message includes the indication that the first UE is to activate the first relay connection further includes an indication that the first access connection with the base station is to be activated or deactivated.

In some examples, the data message receiver 645 may be configured as or otherwise support a means for receiving, based on receiving the indication in the control message, one or more additional data messages from the base station on the first relay connection according to the received configuration information for the first relay connection.

In some examples, to support receiving the indication that the first UE is to activate the first relay connection and the second relay connection, the relay activation component 635 may be configured as or otherwise support a means for receiving the indication from the base station via the first access connection or from the base station via the sidelink connection.

In some examples, the relay configuration information receiver 630 may be configured as or otherwise support a means for receiving a configuration identifying a format for grants of resources of the first relay connection and one or more of the first access connection or the sidelink connection. In some examples, the grant receiver 655 may be configured as or otherwise support a means for receiving, according to the received configuration, one or more of a downlink grant, an uplink grant, or a sidelink grant.

Figure 7:
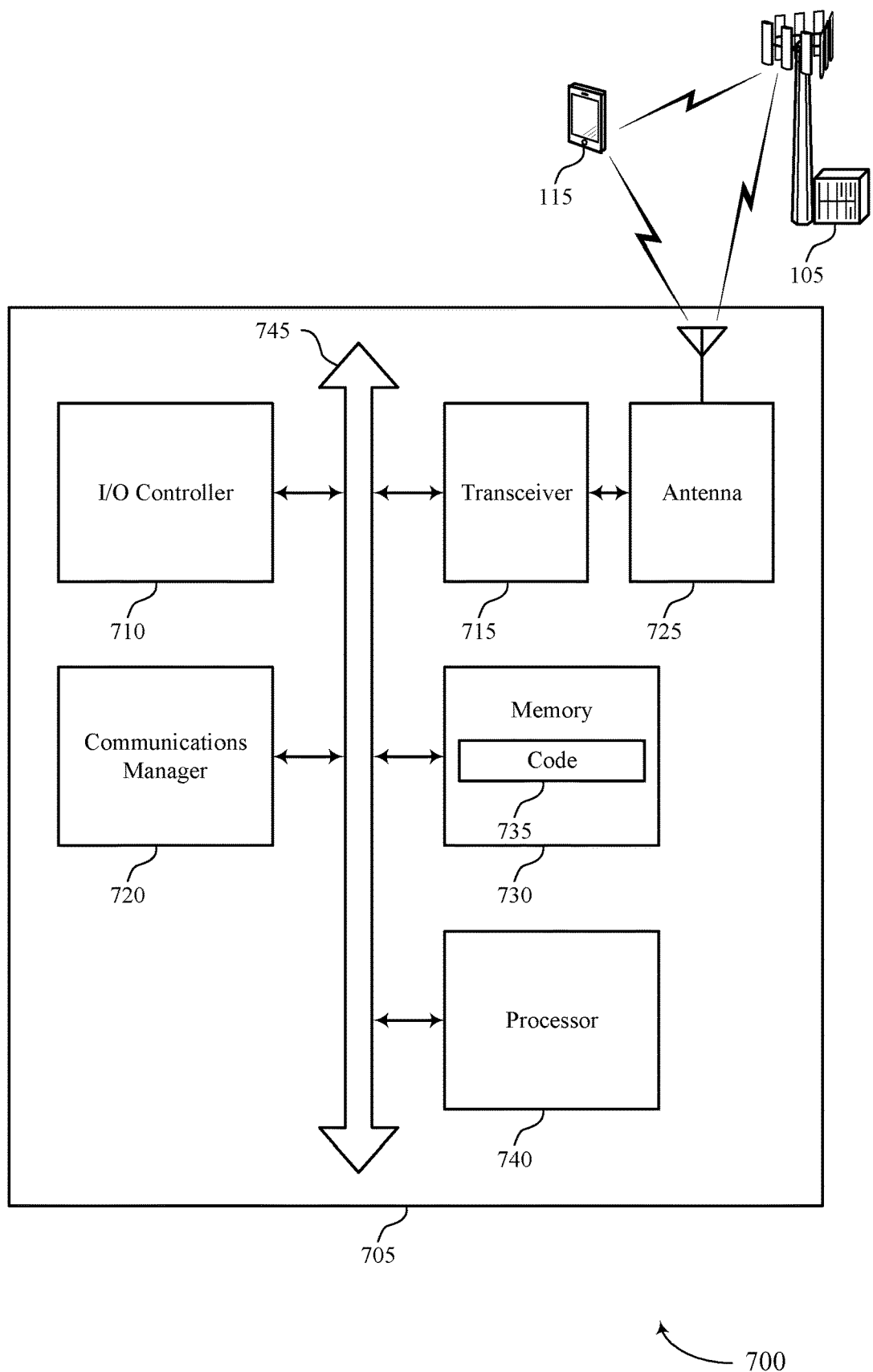
FIG. 7 shows a diagram of a system including a device that supports multiconnectivity for joint UE relaying in accordance with aspects of the present disclosure.

FIG. 7 shows a diagram of a system 700 including a device 705 that supports multiconnectivity for joint UE relaying in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting multiconnectivity for joint UE relaying). For example, the device 705 or a component of the device 705 may include a processor 740 and memory 730 coupled to the processor 740, the processor 740 and memory 730 configured to perform various functions described herein.

The communications manager 720 may support wireless communication at a first UE in accordance with examples as disclosed herein. For example, the communications manager 720 may be configured as or otherwise support a means for establishing a first access connection with a base station and a sidelink connection with a second UE. The communications manager 720 may be configured as or otherwise support a means for receiving, from the base station via the first access connection, configuration information for a first relay connection and a second relay connection, the first relay connection between the first UE and the base station via the second UE using the sidelink connection, and the second relay connection between the base station and the second UE via the first UE using the sidelink connection and the first access connection. The communications manager 720 may be configured as or otherwise support a means for receiving, in a control message from the base station, an indication that the first UE is to activate the first relay connection and the second relay connection. The communications manager 720 may be configured as or otherwise support a means for transmitting, based on the indication in the control message, one or more data messages to the base station on the first relay connection according to the received configuration information for the first relay connection. The communications manager 720 may be configured as or otherwise support a means for receiving one or more data messages from the second UE on the sidelink connection according to the second relay connection. The communications manager 720 may be configured as or otherwise support a means for transmitting the one or more data messages from the second UE to the base station on the first connection according to the second relay connection.

By including or configuring the communications manager 720 in accordance with examples as described herein, the device 705 may support techniques for using established connections as part of a joint relay system. The device 705 may communicate with other devices using one or more links of the joint relay, which may enable the device 705 to select or aggregate communication links to increase communications reliability. The joint relay system may provide increased link diversity, which may increase throughput and provide opportunities for traffic offload. Further, increased link diversity may enable the device 705 to mitigate latency or poor performance caused by blockages or other interruptions. For example, if a direct link between a base station and the device 705 is blocked, the device 705 may utilize a relay connection to circumvent the blockage and prevent subsequent delays.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of multiconnectivity for joint UE relaying as described herein, or the processor 740 and the memory 730 may be otherwise configured to perform or support such operations.

Figure 8:
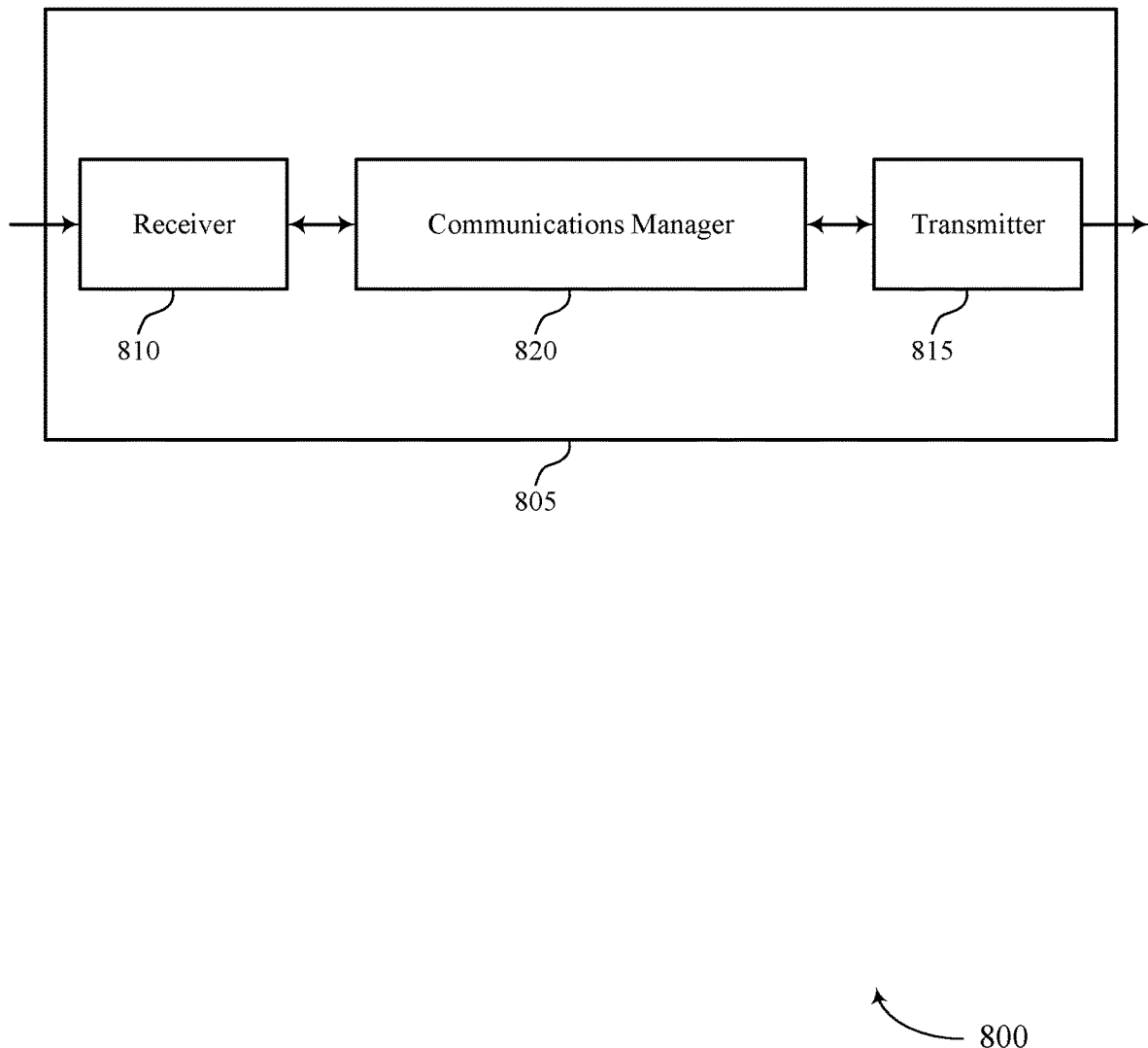
FIGS. 8 and 9 show block diagrams of devices that support multiconnectivity for joint UE relaying in accordance with aspects of the present disclosure.

FIG. 8 shows a block diagram 800 of a device 805 that supports multiconnectivity for joint UE relaying in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to multiconnectivity for joint UE relaying). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to multiconnectivity for joint UE relaying). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of multiconnectivity for joint UE relaying as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a base station in accordance with examples as disclosed herein. For example, the communications manager 820 may be configured as or otherwise support a means for establishing a first access connection with a first UE and a second access connection with a second UE. The communications manager 820 may be configured as or otherwise support a means for transmitting, to the first UE via the first access connection, configuration information for a first relay connection and a second relay connection, the first relay connection between the first UE and the base station, the first relay connection via the second UE using a sidelink connection between the first UE and the second UE and the second access connection between the base station and the second UE, and the second relay connection between the base station and the second UE via the first UE using the sidelink connection and the first access connection. The communications manager 820 may be configured as or otherwise support a means for transmitting, in a control message to the first UE, an indication that the first UE is to activate the first relay connection. The communications manager 820 may be configured as or otherwise support a means for receiving, based on the indication in the control message, one or more data messages from the first UE via the second UE on the first relay connection. The communications manager 820 may be configured as or otherwise support a means for receiving, based on the indication in the control message, one or more data messages from the second UE via the first UE on the second relay connection.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for using established connections as part of a joint relay system. The device 805 may communicate with other devices using one or more links of the joint relay, which may enable the device 805 to select or aggregate communication links to increase communications reliability and robustness.

Figure 9:
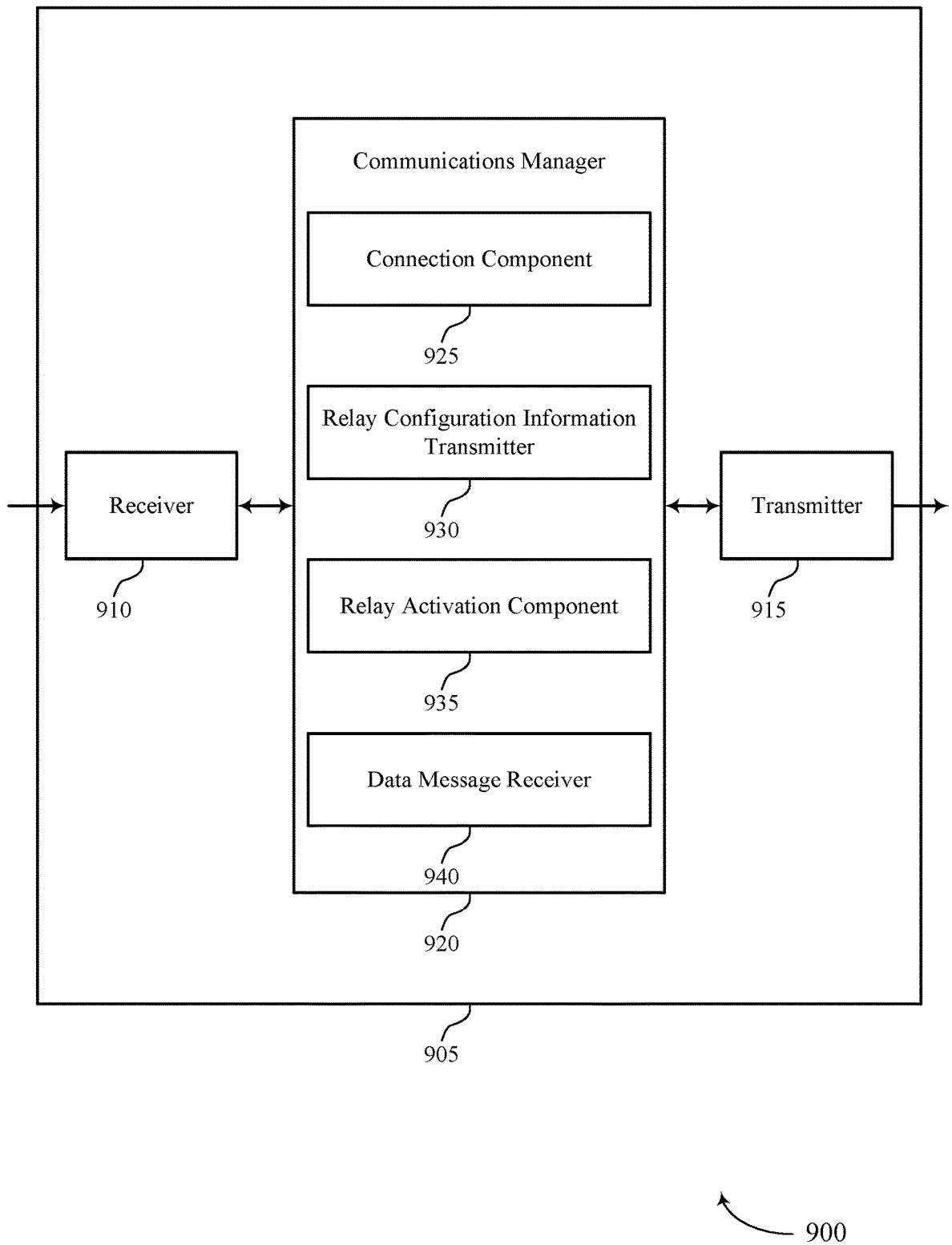

FIG. 9 shows a block diagram 900 of a device 905 that supports multiconnectivity for joint UE relaying in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to multiconnectivity for joint UE relaying). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to multiconnectivity for joint UE relaying). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of multiconnectivity for joint UE relaying as described herein. For example, the communications manager 920 may include a connection component 925, a relay configuration information transmitter 930, a relay activation component 935, a data message receiver 940, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. The connection component 925 may be configured as or otherwise support a means for establishing a first access connection with a first UE and a second access connection with a second UE. The relay configuration information transmitter 930 may be configured as or otherwise support a means for transmitting, to the first UE via the first access connection, configuration information for a first relay connection and a second relay connection, the first relay connection between the first UE and the base station, the first relay connection via the second UE using a sidelink connection between the first UE and the second UE and the second access connection between the base station and the second UE, and the second relay connection between the base station and the second UE via the first UE using the sidelink connection and the first access connection. The relay activation component 935 may be configured as or otherwise support a means for transmitting, in a control message to the first UE, an indication that the first UE is to activate the first relay connection. The data message receiver 940 may be configured as or otherwise support a means for receiving, based on the indication in the control message, one or more data messages from the first UE via the second UE on the first relay connection. The data message receiver 940 may be configured as or otherwise support a means for receiving, based on the indication in the control message, one or more data messages from the second UE via the first UE on the second relay connection.

Figure 10:
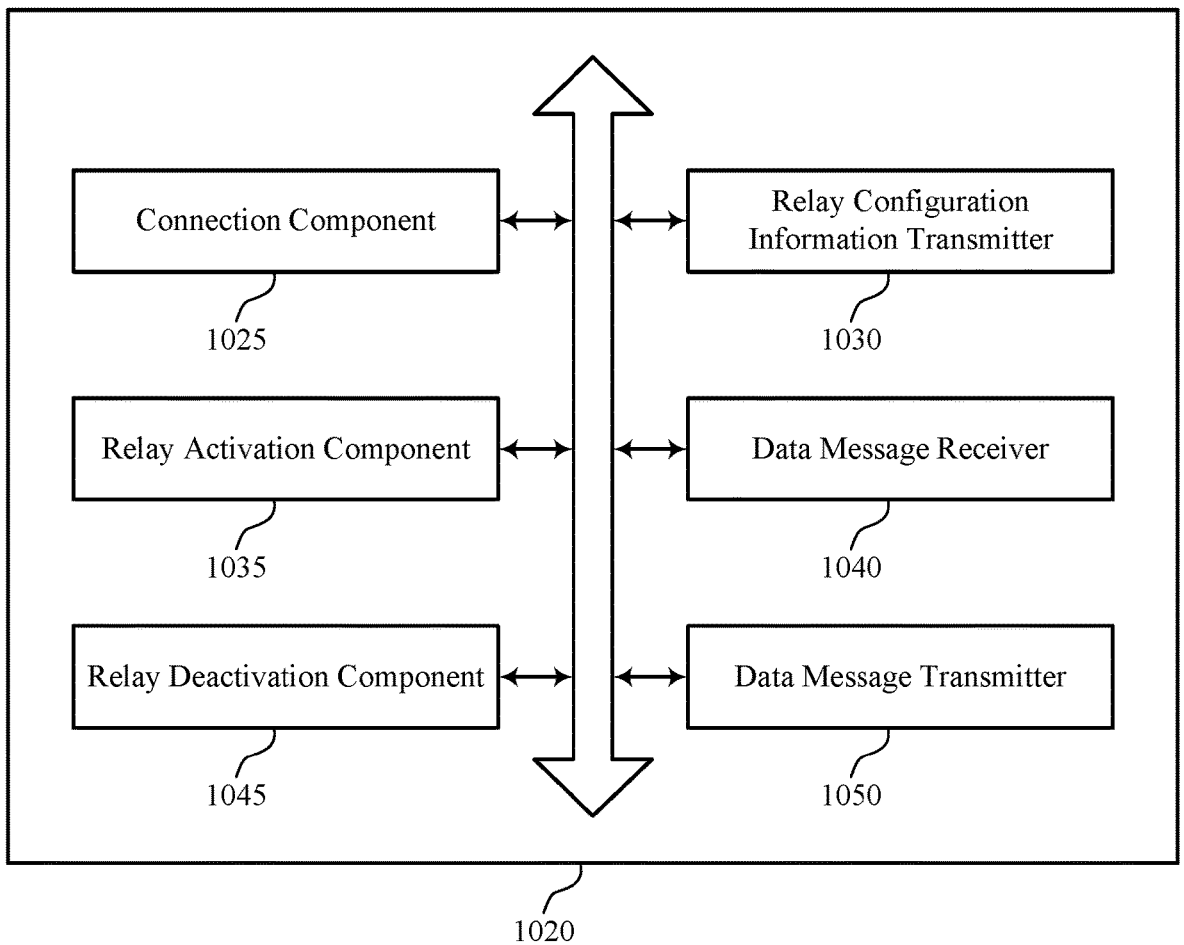
FIG. 10 shows a block diagram of a communications manager that supports multiconnectivity for joint UE relaying in accordance with aspects of the present disclosure.

FIG. 10 shows a block diagram 1000 of a communications manager 1020 that supports multiconnectivity for joint UE relaying in accordance with aspects of the present disclosure. The communications manager 1020 may be an example of aspects of a communications manager 820, a communications manager 920, or both, as described herein. The communications manager 1020, or various components thereof, may be an example of means for performing various aspects of multiconnectivity for joint UE relaying as described herein. For example, the communications manager 1020 may include a connection component 1025, a relay configuration information transmitter 1030, a relay activation component 1035, a data message receiver 1040, a relay deactivation component 1045, a data message transmitter 1050, or any combination thereof. Each of these components may communicate, directly or indirectly, with one another (e.g., via one or more buses).

The communications manager 1020 may support wireless communication at a base station in accordance with examples as disclosed herein. The connection component 1025 may be configured as or otherwise support a means for establishing a first access connection with a first UE and a second access connection with a second UE. The relay configuration information transmitter 1030 may be configured as or otherwise support a means for transmitting, to the first UE via the first access connection, configuration information for a first relay connection and a second relay connection, the first relay connection between the first UE and the base station, the first relay connection via the second UE using a sidelink connection between the first UE and the second UE and the second access connection between the base station and the second UE, and the second relay connection between the base station and the second UE via the first UE using the sidelink connection and the first access connection. The relay activation component 1035 may be configured as or otherwise support a means for transmitting, in a control message to the first UE, an indication that the first UE is to activate the first relay connection. The data message receiver 1040 may be configured as or otherwise support a means for receiving, based on the indication in the control message, one or more data messages from the first UE via the second UE on the first relay connection. In some examples, the data message receiver 1040 may be configured as or otherwise support a means for receiving, based on the indication in the control message, one or more data messages from the second UE via the first UE on the second relay connection.

In some examples, the configuration information for the first relay connection is transmitted in a first configuration message, and the relay configuration information transmitter 1030 may be configured as or otherwise support a means for transmitting a second configuration message including configuration information for the second relay connection.

In some examples, the relay deactivation component 1045 may be configured as or otherwise support a means for transmitting, in a second control message to the first UE via the first access connection and after receiving the one or more data messages on the first relay connection, an indication that the first UE is to deactivate the first relay connection. In some examples, the data message receiver 1040 may be configured as or otherwise support a means for receiving one or more subsequent data messages from the first UE on the first access connection.

In some examples, the relay deactivation component 1045 may be configured as or otherwise support a means for transmitting an indication that the first UE is to deactivate the first relay connection. In some examples, the connection component 1025 may be configured as or otherwise support a means for identifying that the second relay connection is maintained.

In some examples, the relay activation component 1035 may be configured as or otherwise support a means for transmitting, separate from the control message including the indication that the first UE is to activate the first relay connection, a second control message including an indication that the first UE is to activate or deactivate the second relay connection.

In some examples, the control message includes the indication that the first UE is to activate the first relay connection further includes an indication that at least the second relay connection is to be activated or deactivated.

In some examples, the control message includes the indication that the first UE is to activate the first relay connection further includes an indication that the first access connection with the base station is to be activated or deactivated.

In some examples, to support transmitting the indication that the first UE is to activate the first relay connection, the data message transmitter 1050 may be configured as or otherwise support a means for transmitting the indication to the first UE via the first access connection or to the first UE via the second access connection.

Figure 11:
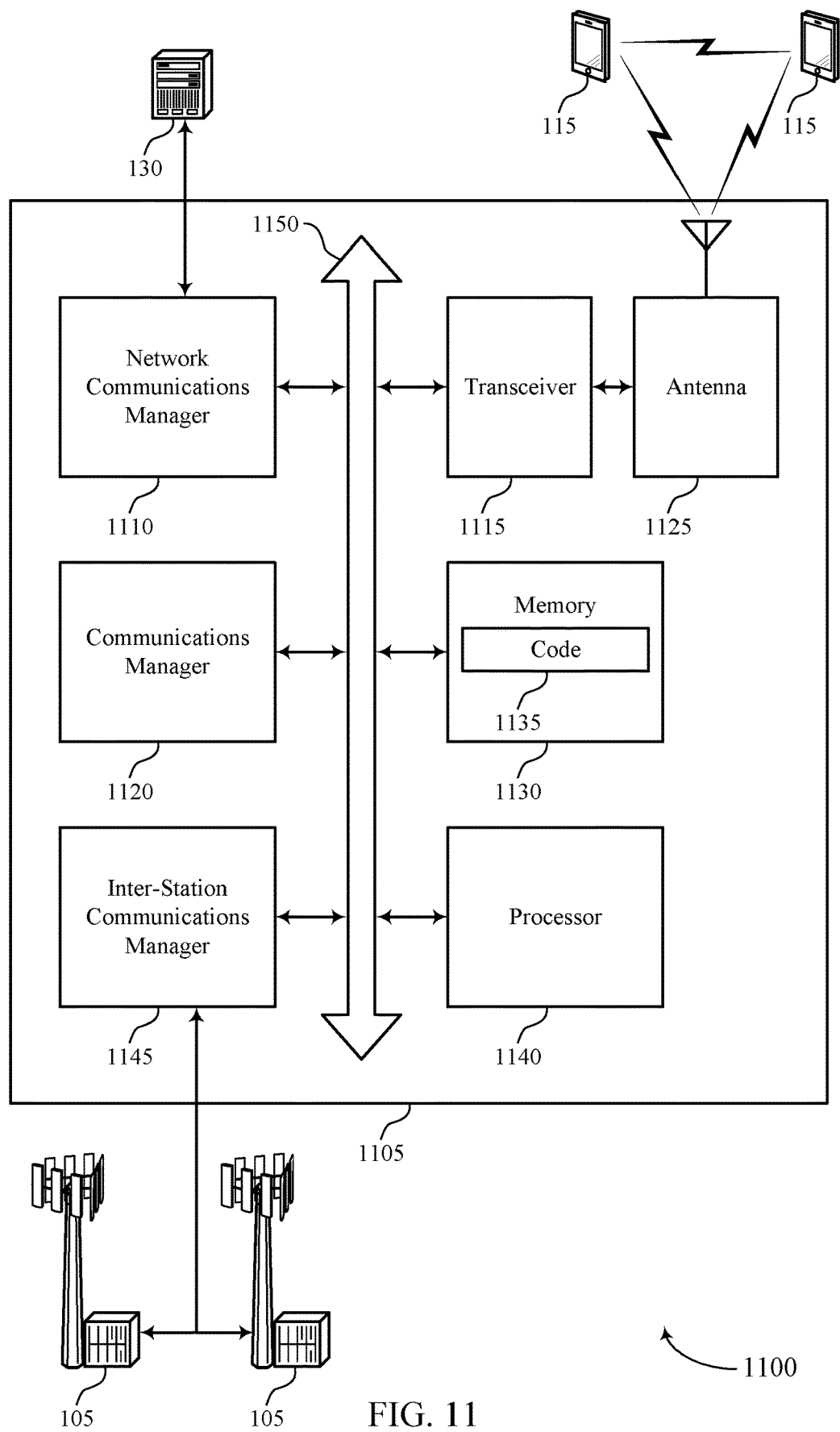
FIG. 11 shows a diagram of a system including a device that supports multiconnectivity for joint UE relaying in accordance with aspects of the present disclosure.

FIG. 11 shows a diagram of a system 1100 including a device 1105 that supports multiconnectivity for joint UE relaying in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting multiconnectivity for joint UE relaying). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a base station in accordance with examples as disclosed herein. For example, the communications manager 1120 may be configured as or otherwise support a means for establishing a first access connection with a first UE and a second access connection with a second UE. The communications manager 1120 may be configured as or otherwise support a means for transmitting, to the first UE via the first access connection, configuration information for a first relay connection and a second relay connection, the first relay connection between the first UE and the base station, the first relay connection via the second UE using a sidelink connection between the first UE and the second UE and the second access connection between the base station and the second UE, and the second relay connection between the base station and the second UE via the first UE using the sidelink connection and the first access connection. The communications manager 1120 may be configured as or otherwise support a means for transmitting, in a control message to the first UE, an indication that the first UE is to activate the first relay connection. The communications manager 1120 may be configured as or otherwise support a means for receiving, based on the indication in the control message, one or more data messages from the first UE via the second UE on the first relay connection. The communications manager 1120 may be configured as or otherwise support a means for receiving, based on the indication in the control message, one or more data messages from the second UE via the first UE on the second relay connection.

By including or configuring the communications manager 1120 in accordance with examples as described herein, the device 1105 may support techniques for using established connections as part of a joint relay system. The device 1105 may communicate with other devices using one or more links of the joint relay, which may enable the device 1105 to select or aggregate communication links to increase communications reliability and robustness. Further, the device 1105 may utilize link diversity to increase communications efficiency. For example, the device 1105 may choose to transmit or receive over a link that provides relatively better communications performance in comparison to another link.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of multiconnectivity for joint UE relaying as described herein, or the processor 1140 and the memory 1130 may be otherwise configured to perform or support such operations.

Figure 12:
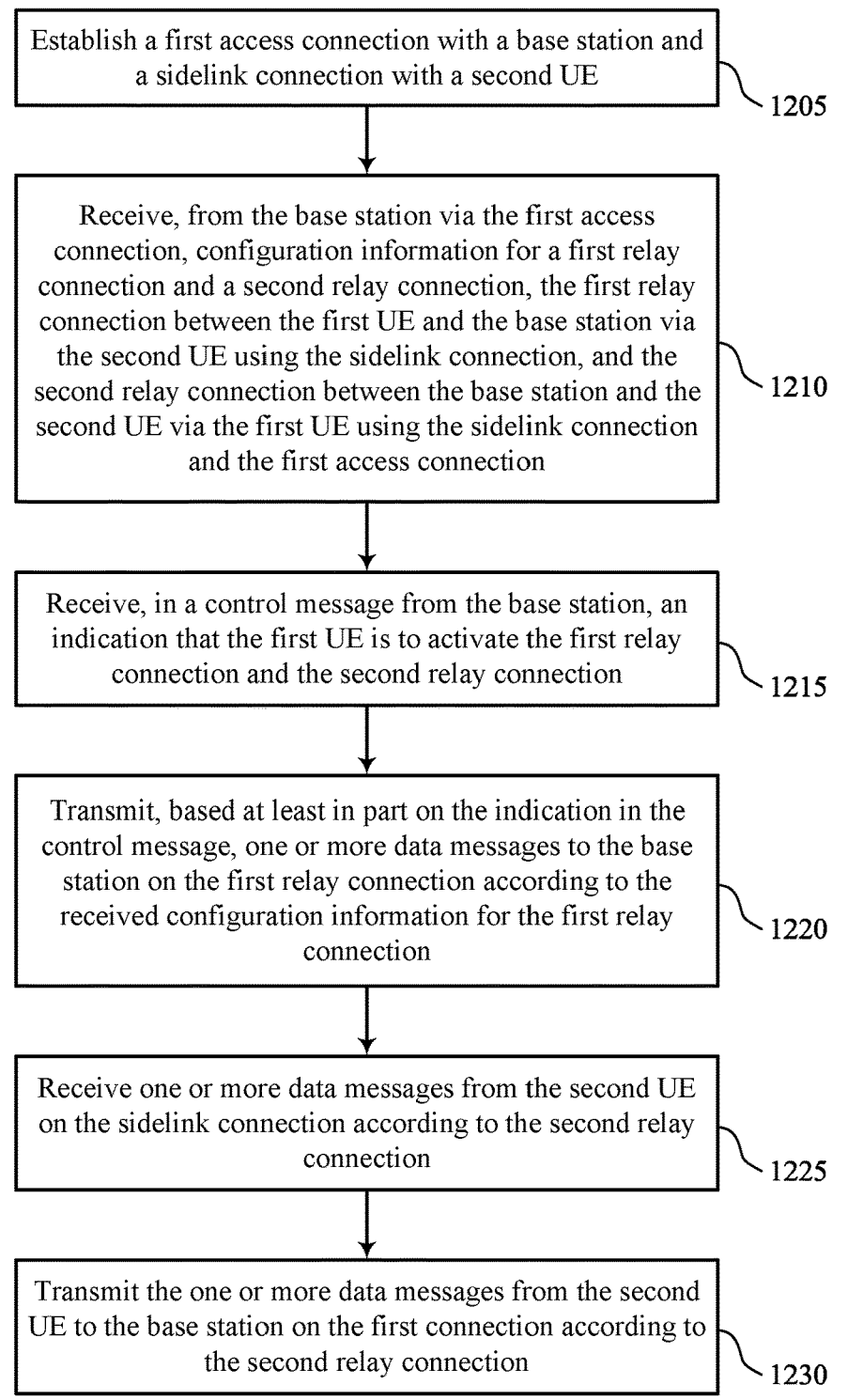
FIGS. 12 and 13 show flowcharts illustrating methods that support multiconnectivity for joint UE relaying in accordance with aspects of the present disclosure.

FIG. 12 shows a flowchart illustrating a method 1200 that supports multiconnectivity for joint UE relaying in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include establishing a first access connection with a base station and a sidelink connection with a second UE. The operations of 1205 may be performed in accordance with examples as disclosed herein. In some examples, aspects of the operations of 1205 may be performed by a connection component 625 as described with reference to FIG. 6.

At 1210, the method may include receiving, from the base station via the first access connection, configuration information for a first relay connection and a second relay connection, the first relay connection between the first UE and the base station via the second UE using the sidelink connection, and the second relay connection between the base station and the second UE via the first UE using the sidelink connection and the first access connection. The operations of 1210 may be performed in accordance with examples as disclosed herein. In some examples, aspects of the operations of 1210 may be performed by a relay configuration information receiver 630 as described with reference to FIG. 6.

At 1215, the method may include receiving, in a control message from the base station, an indication that the first UE is to activate the first relay connection and the second relay connection. The operations of 1215 may be performed in accordance with examples as disclosed herein. In some examples, aspects of the operations of 1215 may be performed by a relay activation component 635 as described with reference to FIG. 6.

At 1220, the method may include transmitting, based on the indication in the control message, one or more data messages to the base station on the first relay connection according to the received configuration information for the first relay connection. The operations of 1220 may be performed in accordance with examples as disclosed herein. In some examples, aspects of the operations of 1220 may be performed by a data message transmitter 640 as described with reference to FIG. 6.

At 1225, the method may include receiving one or more data messages from the second UE on the sidelink connection according to the second relay connection. The operations of 1225 may be performed in accordance with examples as disclosed herein. In some examples, aspects of the operations of 1225 may be performed by a data message receiver 645 as described with reference to FIG. 6.

At 1230, the method may include transmitting the one or more data messages from the second UE to the base station on the first connection according to the second relay connection. The operations of 1230 may be performed in accordance with examples as disclosed herein. In some examples, aspects of the operations of 1230 may be performed by a data message transmitter 640 as described with reference to FIG. 6.

Figure 13:
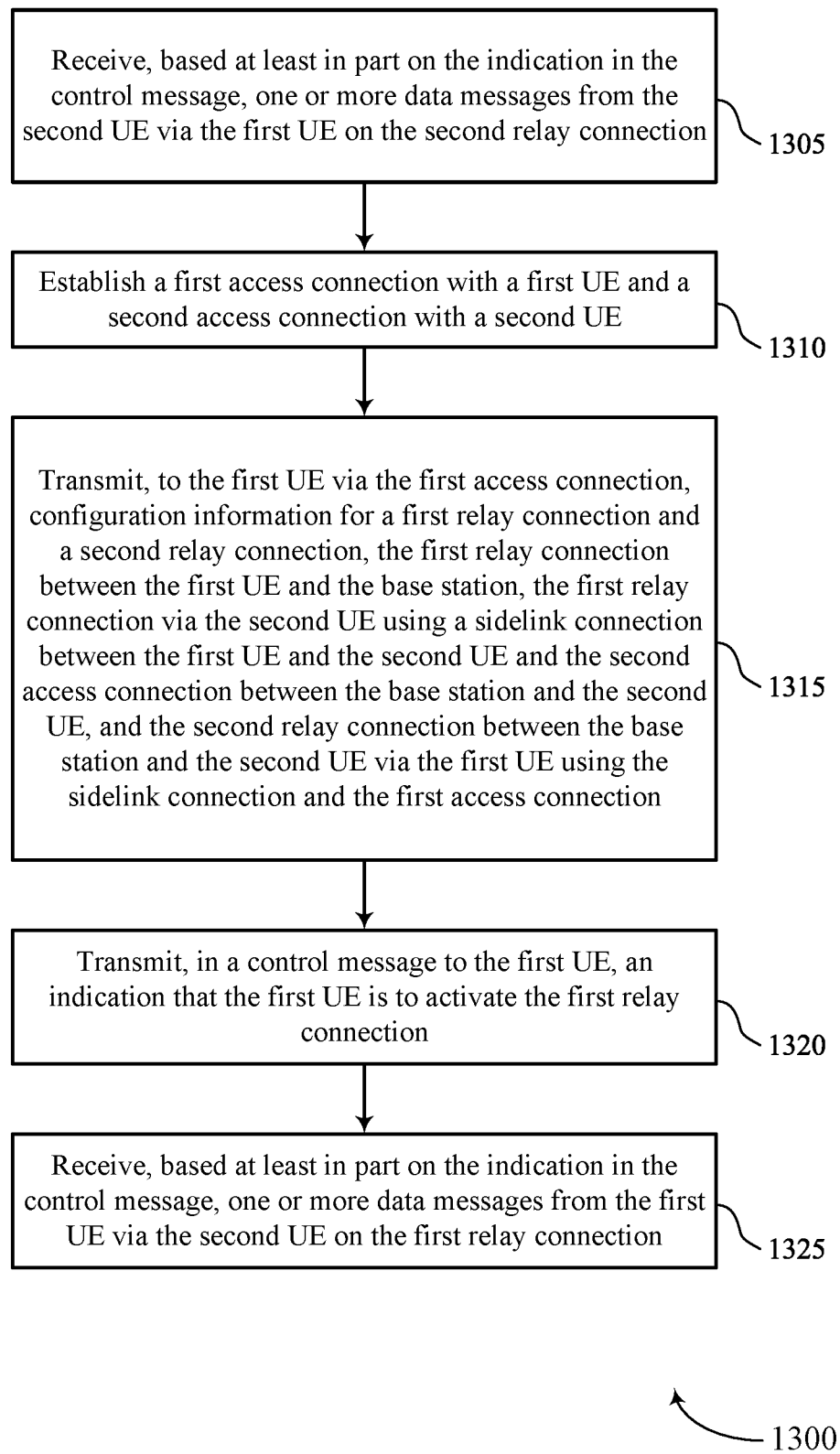

FIG. 13 shows a flowchart illustrating a method 1300 that supports multiconnectivity for joint UE relaying in accordance with aspects of the present disclosure. The operations of the method 1300 may be implemented by a base station or its components as described herein. For example, the operations of the method 1300 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1305, the method may include receiving, based on the indication in the control message, one or more data messages from the second UE via the first UE on the second relay connection. The operations of 1305 may be performed in accordance with examples as disclosed herein. In some examples, aspects of the operations of 1305 may be performed by a data message receiver 1040 as described with reference to FIG. 10.

At 1310, the method may include establishing a first access connection with a first UE and a second access connection with a second UE. The operations of 1310 may be performed in accordance with examples as disclosed herein. In some examples, aspects of the operations of 1310 may be performed by a connection component 1025 as described with reference to FIG. 10.

At 1315, the method may include transmitting, to the first UE via the first access connection, configuration information for a first relay connection and a second relay connection, the first relay connection between the first UE and the base station, the first relay connection via the second UE using a sidelink connection between the first UE and the second UE and the second access connection between the base station and the second UE, and the second relay connection between the base station and the second UE via the first UE using the sidelink connection and the first access connection. The operations of 1315 may be performed in accordance with examples as disclosed herein. In some examples, aspects of the operations of 1315 may be performed by a relay configuration information transmitter 1030 as described with reference to FIG. 10.

At 1320, the method may include transmitting, in a control message to the first UE, an indication that the first UE is to activate the first relay connection. The operations of 1320 may be performed in accordance with examples as disclosed herein. In some examples, aspects of the operations of 1320 may be performed by a relay activation component 1035 as described with reference to FIG. 10.

At 1325, the method may include receiving, based on the indication in the control message, one or more data messages from the first UE via the second UE on the first relay connection. The operations of 1325 may be performed in accordance with examples as disclosed herein. In some examples, aspects of the operations of 1325 may be performed by a data message receiver 1040 as described with reference to FIG. 10.

The following provides an overview of aspects of the present disclosure:

Aspect 1: A method for wireless communication at a first UE, comprising: establishing a first access connection with a base station and a sidelink connection with a second UE; receiving, from the base station via the first access connection, configuration information for a first relay connection and a second relay connection, the first relay connection between the first UE and the base station via the second UE using the sidelink connection, and the second relay connection between the base station and the second UE via the first UE using the sidelink connection and the first access connection; receiving, in a control message from the base station, an indication that the first UE is to activate the first relay connection and the second relay connection; transmitting, based at least in part on the indication in the control message, one or more data messages to the base station on the first relay connection according to the received configuration information for the first relay connection; receiving one or more data messages from the second UE on the sidelink connection according to the second relay connection; and transmitting the one or more data messages from the second UE to the base station on the first connection according to the second relay connection.

Aspect 2: The method of aspect 1, further comprising: receiving, in a second control message from the base station via the first access connection and after transmitting the one or more data messages on the first relay connection, an indication that the first UE is to deactivate the first relay connection; and transmitting one or more subsequent data messages to the base station on the first access connection.

Aspect 3: The method of aspect 2, further comprising: identifying a radio bearer associated with the first relay connection between the first UE and the base station; receiving an indication that the first UE is to deactivate the first relay connection; determining, based at least in part on the receiving the indication that the first UE is to deactivate the first relay connection, that the radio bearer associated with the first relay connection has switched to the first access connection with the base station.

Aspect 4: The method of any of aspects 1 through 3, further comprising: receiving an indication that the first UE is to deactivate the first relay connection; deactivating the first relay connection that is via the second UE in response to the received indication that the first UE is to deactivate the first relay connection; and maintaining the second relay connection after deactivating the first relay connection.

Aspect 5: The method of any of aspects 1 through 4, further comprising: receiving, separate from the control message comprising the indication that the first UE is to activate the first relay connection, a second control message comprising an indication that the first UE is to activate or deactivate the second relay connection.

Aspect 6: The method of any of aspects 1 through 5, wherein the control message comprises the indication that the first UE is to activate the relay connection further comprises an indication that at least the second relay connection is to be activated or deactivated.

Aspect 7: The method of aspect 6, wherein the indication of the control message comprises an activation bitmap, each bit of the activation bitmap associated with a corresponding one of the first relay connection or the second relay connection.

Aspect 8: The method of any of aspects 1 through 7, wherein the control message comprises the indication that the first UE is to activate the first relay connection further comprises an indication that the first access connection with the base station is to be activated or deactivated.

Aspect 9: The method of any of aspects 1 through 8, further comprising: receiving, based at least in part on receiving the indication in the control message, one or more additional data messages from the base station on the first relay connection according to the received configuration information for the first relay connection.

Aspect 10: The method of any of aspects 1 through 9, wherein receiving the indication that the first UE is to activate the first relay connection and the second relay connection comprises: receiving the indication from the base station via the first access connection or from the base station via the sidelink connection.

Aspect 11: The method of any of aspects 1 through 10, further comprising: receiving a configuration identifying a format for grants of resources of the first relay connection and one or more of the first access connection or the sidelink connection; and receiving, according to the received configuration, one or more of a downlink grant, an uplink grant, or a sidelink grant.

Aspect 12: A method for wireless communication at a base station, comprising: establishing a first access connection with a first UE and a second access connection with a second UE; transmitting, to the first UE via the first access connection, configuration information for a first relay connection and a second relay connection, the first relay connection between the first UE and the base station, the first relay connection via the second UE using a sidelink connection between the first UE and the second UE and the second access connection between the base station and the second UE, and the second relay connection between the base station and the second UE via the first UE using the sidelink connection and the first access connection; transmitting, in a control message to the first UE, an indication that the first UE is to activate the first relay connection; receiving, based at least in part on the indication in the control message, one or more data messages from the first UE via the second UE on the first relay connection; and receiving, based at least in part on the indication in the control message, one or more data messages from the second UE via the first UE on the second relay connection Aspect 13: The method of aspect 12, wherein the configuration information for the first relay connection is transmitted in a first configuration message, the method further comprising: transmitting a second configuration message comprising configuration information for the second relay connection.

Aspect 14: The method of any of aspects 12 through 13, further comprising: transmitting, in a second control message to the first UE via the first access connection and after receiving the one or more data messages on the first relay connection, an indication that the first UE is to deactivate the first relay connection; and receiving one or more subsequent data messages from the first UE on the first access connection.

Aspect 15: The method of any of aspects 12 through 14, further comprising: transmitting an indication that the first UE is to deactivate the first relay connection; and identifying that the second relay connection is maintained.

Aspect 16: The method of any of aspects 12 through 15, further comprising: transmitting, separate from the control message comprising the indication that the first UE is to activate the first relay connection, a second control message comprising an indication that the first UE is to activate or deactivate the second relay connection.

Aspect 17: The method of any of aspects 12 through 16, wherein the control message comprises the indication that the first UE is to activate the first relay connection further comprises an indication that at least the second relay connection is to be activated or deactivated.

Aspect 18: The method of any of aspects 12 through 17, wherein the control message comprises the indication that the first UE is to activate the first relay connection further comprises an indication that the first access connection with the base station is to be activated or deactivated.

Aspect 19: The method of any of aspects 12 through 18, wherein transmitting the indication that the first UE is to activate the first relay connection comprises: transmitting the indication to the first UE via the first access connection or to the first UE via the second access connection.

Aspect 20: An apparatus for wireless communication at a first UE, comprising a processor; memory coupled with the processor; and instructions stored in the memory and executable by the processor to cause the apparatus to perform a method of any of aspects 1 through 11.

Aspect 21: An apparatus for wireless communication at a first UE, comprising at least one means for performing a method of any of aspects 1 through 11.

Aspect 22: A non-transitory computer-readable medium storing code for wireless communication at a first UE, the code comprising instructions executable by a processor to perform a method of any of aspects 1 through 11.

Aspect 23: An apparatus for wireless communication at a base station, comprising a processor; memory coupled with the processor; and instructions stored in the memory and executable by the processor to cause the apparatus to perform a method of any of aspects 12 through 19.

Aspect 24: An apparatus for wireless communication at a base station, comprising at least one means for performing a method of any of aspects 12 through 19.

Aspect 25: A non-transitory computer-readable medium storing code for wireless communication at a base station, the code comprising instructions executable by a processor to perform a method of any of aspects 12 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
   establishing a first access connection with a base station and a sidelink connection with a second UE;
   receiving, from the base station via the first access connection, configuration information for a first relay connection and a second relay connection, the first relay connection between the first UE and the base station via the second UE using the sidelink connection, and the second relay connection between the base station and the second UE via the first UE using the sidelink connection and the first access connection;

receiving, in a control message from the base station, an indication that the first UE is to activate the first relay connection and the second relay connection;

transmitting, based at least in part on the indication in the control message, one or more data messages to the base station on the first relay connection according to the received configuration information for the first relay connection;

receiving one or more data messages from the second UE on the sidelink connection according to the second relay connection; and transmitting the one or more data messages from the second UE to the base station on the first connection according to the second relay connection.

2. The method of claim 1, further comprising:
receiving, in a second control message from the base station via the first access connection and after transmitting the one or more data messages on the first relay connection, an indication that the first UE is to deactivate the first relay connection; and
transmitting one or more subsequent data messages to the base station on the first access connection.

3. The method of claim 2, further comprising:
identifying a radio bearer associated with the first relay connection between the first UE and the base station;
receiving an indication that the first UE is to deactivate the first relay connection; and
determining, based at least in part on the receiving the indication that the first UE is to deactivate the first relay connection, that the radio bearer associated with the first relay connection has switched to the first access connection with the base station.

4. The method of claim 1, further comprising:
receiving an indication that the first UE is to deactivate the first relay connection;
deactivating the first relay connection that is via the second UE in response to the received indication that the first UE is to deactivate the first relay connection; and
maintaining the second relay connection after deactivating the first relay connection.

5. The method of claim 1, further comprising:
receiving, separate from the control message comprising the indication that the first UE is to activate the first relay connection, a second control message comprising an indication that the first UE is to activate or deactivate the second relay connection.

6. The method of claim 1, wherein the control message comprises the indication that the first UE is to activate the first relay connection further comprises an indication that at least the second relay connection is to be activated or deactivated.

7. The method of claim 6, wherein the indication of the control message comprises an activation bitmap, each bit of the activation bitmap associated with a corresponding one of the first relay connection or the second relay connection.

8. The method of claim 1, wherein the control message comprises the indication that the first UE is to activate the first relay connection further comprises an indication that the first access connection with the base station is to be activated or deactivated.

9. The method of claim 1, further comprising:
receiving, based at least in part on receiving the indication in the control message, one or more additional data messages from the base station on the first relay connection according to the received configuration information for the first relay connection.

10. The method of claim 1, wherein receiving the indication that the first UE is to activate the first relay connection and the second relay connection comprises:
receiving the indication from the base station via the first access connection or from the base station via the sidelink connection.

11. The method of claim 1, further comprising:
receiving a configuration identifying a format for grants of resources of the first relay connection and one or more of the first access connection or the sidelink connection; and
receiving, according to the received configuration, one or more of a downlink grant, an uplink grant, or a sidelink grant.

12. A method for wireless communication at a base station, comprising:
establishing a first access connection with a first user equipment (UE) and a second access connection with a second UE;
transmitting, to the first UE via the first access connection, configuration information for a first relay connection and a second relay connection, the first relay connection between the first UE and the base station, the first relay connection via the second UE using a sidelink connection between the first UE and the second UE and the second access connection between the base station and the second UE, and the second relay connection between the base station and the second UE via the first UE using the sidelink connection and the first access connection;
transmitting, in a control message to the first UE, an indication that the first UE is to activate the first relay connection;
receiving, based at least in part on the indication in the control message, one or more data messages from the first UE via the second UE on the first relay connection; and
receiving, based at least in part on the indication in the control message, one or more data messages from the second UE via the first UE on the second relay connection.

13. The method of claim 12, wherein the configuration information for the first relay connection is transmitted in a first configuration message, the method further comprising:
transmitting a second configuration message comprising configuration information for the second relay connection.

14. The method of claim 12, further comprising:
transmitting, in a second control message to the first UE via the first access connection and after receiving the one or more data messages on the first relay connection, an indication that the first UE is to deactivate the first relay connection; and
receiving one or more subsequent data messages from the first UE on the first access connection.

15. The method of claim 12, further comprising:
transmitting an indication that the first UE is to deactivate the first relay connection; and
identifying that the second relay connection is maintained.

16. The method of claim 12, further comprising:
transmitting, separate from the control message comprising the indication that the first UE is to activate the first relay connection, a second control message comprising an indication that the first UE is to activate or deactivate the second relay connection.

17. The method of claim 12, wherein the control message comprises the indication that the first UE is to activate the first relay connection further comprises an indication that at least the second relay connection is to be activated or deactivated.

18. The method of claim 12, wherein the control message comprises the indication that the first UE is to activate the first relay connection further comprises an indication that the first access connection with the base station is to be activated or deactivated.

19. The method of claim 12, wherein transmitting the indication that the first UE is to activate the first relay connection comprises:
transmitting the indication to the first UE via the first access connection or to the first UE via the second access connection.

20. An apparatus for wireless communication at a first user equipment (UE), comprising:
a processor;
memory coupled with the processor; and
instructions stored in the memory and executable by the processor to cause the apparatus to:
establish a first access connection with a base station and a sidelink connection with a second UE;
receive, from the base station via the first access connection, configuration information for a first relay connection and a second relay connection, the first relay connection between the first UE and the base station via the second UE using the sidelink connection, and the second relay connection between the base station and the second UE via the first UE using the sidelink connection and the first access connection;
receive, in a control message from the base station, an indication that the first UE is to activate the first relay connection and the second relay connection;
transmit, based at least in part on the indication in the control message, one or more data messages to the base station on the first relay connection according to the received configuration information for the first relay connection;
receive one or more data messages from the second UE on the sidelink connection according to the second relay connection; and
transmit the one or more data messages from the second UE to the base station on the first connection according to the second relay connection.

21. The apparatus of claim 20, wherein the instructions are further executable by the processor to cause the apparatus to:
receive, in a second control message from the base station via the first access connection and after transmitting the one or more data messages on the first relay connection, an indication that the first UE is to deactivate the first relay connection; and
transmit one or more subsequent data messages to the base station on the first access connection.

22. The apparatus of claim 21, wherein the instructions are further executable by the processor to cause the apparatus to:
identify a radio bearer associated with the first relay connection between the first UE and the base station;
receive an indication that the first UE is to deactivate the first relay connection; and
determine, based at least in part on the receiving the indication that the first UE is to deactivate the first relay connection, that the radio bearer associated with the first relay connection has switched to the first access connection with the base station.

23. The apparatus of claim 20, wherein the instructions are further executable by the processor to cause the apparatus to:
receive an indication that the first UE is to deactivate the first relay connection;
deactivate the first relay connection that is via the second UE in response to the received indication that the first UE is to deactivate the first relay connection; and
maintaining the second relay connection after deactivating the first relay connection.

24. The apparatus of claim 20, wherein the instructions are further executable by the processor to cause the apparatus to:
receive, separate from the control message comprising the indication that the first UE is to activate the first relay connection, a second control message comprising an indication that the first UE is to activate or deactivate the second relay connection.

25. The apparatus of claim 20, wherein the control message comprises the indication that the first UE is to activate the relay connection further comprises an indication that at least the second relay connection is to be activated or deactivated.

26. An apparatus for wireless communication at a base station, comprising:
a processor;
memory coupled with the processor; and
instructions stored in the memory and executable by the processor to cause the apparatus to:
establish a first access connection with a first user equipment (UE) and a second access connection with a second UE;
transmit, to the first UE via the first access connection, configuration information for a first relay connection and a second relay connection, the first relay connection between the first UE and the base station, the first relay connection via the second UE using a sidelink connection between the first UE and the second UE and the second access connection between the base station and the second UE, and the second relay connection between the base station and the second UE via the first UE using the sidelink connection and the first access connection;
transmit, in a control message to the first UE, an indication that the first UE is to activate the first relay connection;
receive, based at least in part on the indication in the control message, one or more data messages from the first UE via the second UE on the first relay connection; and
receive, based at least in part on the indication in the control message, one or more data messages from the second UE via the first UE on the second relay connection.

27. The apparatus of claim 26, wherein the configuration information for the first relay connection is transmitted in a first configuration message, and the instructions are further executable by the processor to cause the apparatus to:

transmit a second configuration message comprising configuration information for the second relay connection.

28. The apparatus of claim 26, wherein the instructions are further executable by the processor to cause the apparatus to:

transmit, in a second control message to the first UE via the first access connection and after receiving the one or more data messages on the first relay connection, an indication that the first UE is to deactivate the first relay connection; and receive one or more subsequent data messages from the first UE on the first access connection.

29. The apparatus of claim 26, wherein the instructions are further executable by the processor to cause the apparatus to:

transmit an indication that the first UE is to deactivate the first relay connection; and identify that the second relay connection is maintained.

30. The apparatus of claim 26, wherein the instructions are further executable by the processor to cause the apparatus to:

transmit, separate from the control message comprising the indication that the first UE is to activate the first relay connection, a second control message comprising an indication that the first UE is to activate or deactivate the second relay connection.

* * * * *